US009666359B2

(12) United States Patent
Ichikawa et al.

(10) Patent No.: US 9,666,359 B2
(45) Date of Patent: May 30, 2017

(54) VEHICLE, POWER RECEIVING DEVICE, POWER TRANSMITTING DEVICE, AND CONTACTLESS POWER SUPPLY SYSTEM

(71) Applicants: Shinji Ichikawa, Toyota (JP); Keisuke Inoue, Obu (JP); Naoki Gorai, Toyota (JP)

(72) Inventors: Shinji Ichikawa, Toyota (JP); Keisuke Inoue, Obu (JP); Naoki Gorai, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 568 days.

(21) Appl. No.: 13/860,167

(22) Filed: Apr. 10, 2013

(65) Prior Publication Data

US 2013/0300354 A1    Nov. 14, 2013

(30) Foreign Application Priority Data

May 11, 2012    (JP) .................................. 2012-109471

(51) Int. Cl.
| | |
|---|---|
| H01F 38/14 | (2006.01) |
| B60R 16/03 | (2006.01) |
| H02J 7/02 | (2016.01) |
| H04L 29/08 | (2006.01) |
| H04W 4/02 | (2009.01) |

(52) U.S. Cl.
CPC ............ *H01F 38/14* (2013.01); *B60R 16/03* (2013.01); *H02J 7/025* (2013.01); *H04L 67/12* (2013.01); *H04W 4/023* (2013.01)

(58) Field of Classification Search
CPC ...................................................... B60R 16/03
USPC ........................................................ 320/108
See application file for complete search history.

(56) References Cited

U.S. PATENT DOCUMENTS

| | | | |
|---|---|---|---|
| 2002/0016153 A1* | 2/2002 | Sato et al. ...................... 455/41 |
| 2007/0149124 A1* | 6/2007 | Onozawa ..................... 455/41.2 |
| 2010/0201310 A1* | 8/2010 | Vorenkamp et al. .......... 320/108 |
| 2012/0098330 A1* | 4/2012 | Ichikawa et al. ............... 307/9.1 |
| 2012/0242161 A1* | 9/2012 | Kudo et al. .................... 307/104 |

(Continued)

FOREIGN PATENT DOCUMENTS

| | | |
|---|---|---|
| JP | A-2002-118577 | 4/2002 |
| JP | 2007150668 A | 6/2007 |

(Continued)

*Primary Examiner* — Samuel Berhanu
*Assistant Examiner* — Tessema Kebede
(74) *Attorney, Agent, or Firm* — Oliff PLC

(57) ABSTRACT

A vehicle is able to contactlessly receive electric power from a power transmitting device and to charge a mounted electrical storage device (electric load). The vehicle includes a communication unit that carries out wireless communication with the power transmitting device and a vehicle ECU (control unit) that controls the communication unit. The communication unit is able to switch a communication range between a wide communication range (wire-area communication) and a narrow communication range (narrow-area communication). The vehicle ECU, at the time of identifying a power transmitting device from which electric power should be received, controls the communication unit such that the communication unit communicates with the power transmitting device using the narrow-area communication.

25 Claims, 18 Drawing Sheets

(56) References Cited

U.S. PATENT DOCUMENTS

2012/0268238 A1* 10/2012 Park .................. G07F 15/006
                                                        340/5.8
2012/0326499 A1    12/2012 Ichikawa et al.
2013/0181669 A1     7/2013 Kawasaki

FOREIGN PATENT DOCUMENTS

| JP | 2007158447 A      | 6/2007  |
| JP | 2010273473 A      | 12/2010 |
| JP | 2010284006 A      | 12/2010 |
| JP | A-2011-142769     | 7/2011  |
| JP | A-2011-147213     | 7/2011  |
| JP | A-2011-250555     | 12/2011 |
| WO | WO 2011/148254 A2 | 12/2011 |
| WO | WO 2012/042902 A1 | 4/2012  |

* cited by examiner

VEHICLE, POWER RECEIVING DEVICE, POWER TRANSMITTING DEVICE, AND CONTACTLESS POWER SUPPLY SYSTEM

INCORPORATION BY REFERENCE

The disclosure of Japanese Patent Application No. 2012-109471 filed on May 11, 2012 including the specification, drawings and abstract is incorporated herein by reference in its entirety.

BACKGROUND OF THE INVENTION

1. Field of the Invention

The invention relates to a vehicle, a power receiving device, a power transmitting device and a contactless power supply system and, more particularly, to communication control between a power transmitting device and a vehicle in a contactless power supply system that contactlessly supplies electric power from an external power supply to the vehicle.

2. Description of Related Art

In recent years, contactless wireless power transfer that does not use a power cord or a power transmission cable has become a focus of attention, and it has been suggested that the contactless wireless power transfer is applied to an electric vehicle, a hybrid vehicle, or the like, of which an in-vehicle electrical storage device is chargeable by a power supply outside the vehicle (hereinafter, also referred to as "external power supply").

Japanese Patent Application Publication No. 2011-250555 (JP 2011-250555 A) describes a configuration that, in a power supply system that contactlessly supplies electric power from a power supply facility outside a vehicle to the vehicle, information about a charging efficiency, an amount of charge, and the like, is transmitted through wireless communication between the power supply facility and the vehicle and then appropriate charging is carried out on the basis of these pieces of information.

A contactless power supply system is predicated upon no wire connection between a power transmitting device and a vehicle, so, basically, transmission of information between the power transmitting device and the vehicle is also desirably carried out through wireless communication as in the case of JP 2011-250555 A.

In the case of searching for a power transmitting device that is usable with the use of wireless communication, a relatively wide-area communication range is desirably used. However, for example, when contactless power supply is performed in a place in which a plurality of parking spaces are located in proximity to one another, such as a parking lot of a commercial facility and a charging station, a wide communication range may cause communication with another adjacent power transmitting device in the case where a vehicle is parked in a selected parking space.

Then, pairing is not appropriately performed between a power transmitting device and a vehicle, and, for example, electric power may possibly be transmitted to a vehicle, which should be originally charged, on the basis of information about another vehicle parked in an adjacent parking space.

SUMMARY OF THE INVENTION

The invention provides a power receiving device, a power transmitting device, a vehicle equipped with a power receiving device, and a contactless power supply system, which are able to transmit information by correctly performing pairing between the power transmitting device and the power receiving device with the use of wireless communication.

An aspect of the invention provides a vehicle that contactlessly receives electric power from a power transmitting device. The vehicle includes: a power receiving unit that is configured to contactlessly receive electric power from the power transmitting device; an electric load that is configured to operate by utilizing electric power received by the power receiving unit; a communication unit that is configured to carry out wireless communication with the power transmitting device; and a control unit that is configured to control the communication unit. The communication unit is configured to switch a spatially communicable communication range between a first range and a second range narrower than the first range. The control unit is configured to, at the time of identifying the power transmitting device from which electric power should be received, control the communication unit such that the communication unit communicates with the power transmitting device using the second range.

The control unit may be configured to switch the communication range from the first range to the second range on the basis of information that indicates that a distance to the power transmitting device has become a predetermined distance.

The control unit may be configured to, after identifying the power transmitting device, switch the communication range from the second range to the first range.

The electric load may include an electrical storage device that is configured to store electric power received by the power receiving unit. The control unit may be configured to, after charging of the electrical storage device has been completed, switch the communication range from the second range to the first range.

The control unit may be configured to, when communication is carried out using the first range, communicate with the power transmitting device on at least information about whether the power transmitting device is allowed to supply electric power.

The electric load may include an electrical storage device that is configured to store electric power received by the power receiving unit. The control unit may be configured to, when communication is carried out using the second range, communicate with the power transmitting device on at least one of information about a charging efficiency, information about an amount of charge of the electrical storage device and information about a fee for charging.

The control unit may be configured to, when a plurality of the power transmitting devices are recognized while communication is being carried out using the second range, stop transmission of electric power from the power transmitting devices.

The communication unit may be configured to switch the communication range by varying a power of a signal that is used for communication.

The control unit may be configured to, when a transfer efficiency of electric power received by the power receiving unit with respect to electric power transmitted from the power transmitting device does not satisfy a predetermined condition, stop transmission of electric power from the power transmitting device.

The power transmitting device may include a power transmitting unit that is configured to contactlessly transmit electric power to the power receiving unit. A difference between a natural frequency of the power transmitting unit and a natural frequency of the power receiving unit may be smaller than or equal to ±10% of one of the natural frequency of the power transmitting unit and the natural frequency of the power receiving unit.

The power transmitting device may include a power transmitting unit that is configured to contactlessly transmit electric power to the power receiving unit. A coupling coefficient between the power transmitting unit and the power receiving unit may be smaller than or equal to 0.1.

The power transmitting device may include a power transmitting unit that is configured to contactlessly transmit electric power to the power receiving unit. The power receiving unit may be configured to receive electric power from the power transmitting unit through at least one of a magnetic field that is formed between the power receiving unit and the power transmitting unit and that oscillates at a predetermined frequency and an electric field that is formed between the power receiving unit and the power transmitting unit and that oscillates at a predetermined frequency.

Another aspect of the invention provides a power receiving device that contactlessly receives electric power from a power transmitting device. The power receiving device includes: a power receiving unit that is configured to contactlessly receive electric power from the power transmitting device; a communication unit that is configured to carry out wireless communication with the power transmitting device; and a control unit that is configured to control the communication unit. The communication unit is configured to switch a spatially communicable communication range between a first range and a second range narrower than the first range. The control unit is configured to, at the time of identifying the power transmitting device from which electric power should be received, control the communication unit such that the communication unit communicates with the power transmitting device using the second range.

Further another aspect of the invention provides a power transmitting device that contactlessly supplies electric power to a power receiving device. The power transmitting device includes: a power transmitting unit that is configured to contactlessly transmit electric power to the power receiving device; a communication unit that is configured to carry out wireless communication with the power receiving device; and a control unit that is configured to control the communication unit. The communication unit is configured to switch a spatially communicable communication range between a first range and a second range narrower than the first range. The control unit is configured to, at the time of identifying the power receiving device to which electric power should be transmitted, control the communication unit such that the communication unit communicates with the power receiving device using the second range.

The control unit may be configured to switch the communication range from the first range to the second range on the basis of information that indicates that a distance to the power receiving device has become a predetermined distance.

The control unit may be configured to, after identifying the power receiving device, switch the communication range from the second range to the first range.

Electric power received by the power receiving device may be charged to an electrical storage device. The control unit may be configured to, after charging of the electrical storage device has been completed, switch the communication range from the second range to the first range.

The control unit may be configured to, when communication is carried out using the first range, communicate with the power receiving device on at least information about whether the power transmitting device is allowed to supply electric power.

Electric power received by the power receiving device may be charged to an electrical storage device. The control unit may be configured to, when communication is carried out using the second range, communicate with the power receiving device on at least one of information about a charging efficiency, information about an amount of charge of the electrical storage device and information about a fee for charging.

The control unit may be configured to, when a plurality of the power receiving devices are recognized while communication is being carried out using the second range, stop transmission of electric power to the power receiving devices.

The communication unit may be configured to switch the communication range by varying a power of a signal that is used for communication.

The control unit may be configured to, when a transfer efficiency of electric power received by the power receiving device with respect to electric power transmitted from the power transmitting unit does not satisfy a predetermined condition, stop transmission of electric power to the power receiving device.

The power receiving device may include a power receiving unit that is configured to contactlessly receive electric power from the power transmitting unit. A difference between a natural frequency of the power transmitting unit and a natural frequency of the power receiving unit may be smaller than or equal to ±10% of one of the natural frequency of the power transmitting unit and the natural frequency of the power receiving unit.

The power receiving device may include a power receiving unit that is configured to contactlessly receive electric power from the power transmitting unit. A coupling coefficient between the power transmitting unit and the power receiving unit may be smaller than or equal to 0.1.

The power receiving device may include a power receiving unit that is configured to contactlessly receive electric power from the power transmitting unit. The power receiving unit may be configured to receive electric power from the power transmitting unit through at least one of a magnetic field that is formed between the power receiving unit and the power transmitting unit and that oscillates at a predetermined frequency and an electric field that is formed between the power receiving unit and the power transmitting unit and that oscillates at a predetermined frequency.

Yet another aspect of the invention provides a contactless power supply system. The contactless power supply system includes: a power transmitting device that includes a power transmitting unit; a vehicle that includes a power receiving unit; a communication unit that is configured to carry out wireless communication between the power transmitting device and the vehicle; and a control unit that is configured to control the communication unit. The communication unit is configured to switch a spatially communicable communication range between a first range and a second range narrower than the first range. The control unit is configured to, at the time of identifying a combination of the power transmitting device and the vehicle, control the communication unit such that the communication unit carries out communication using the second range. The contactless power supply system contactlessly transfers electric power from the power transmitting device to the vehicle With the above-described vehicle, power receiving device, power transmitting device and contactless power supply system, it is possible to correctly perform pairing between the power transmitting device and the power receiving device by configuring the contactless power supply system that is able to transmit information between the power transmitting device and the power receiving device using wireless communication.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
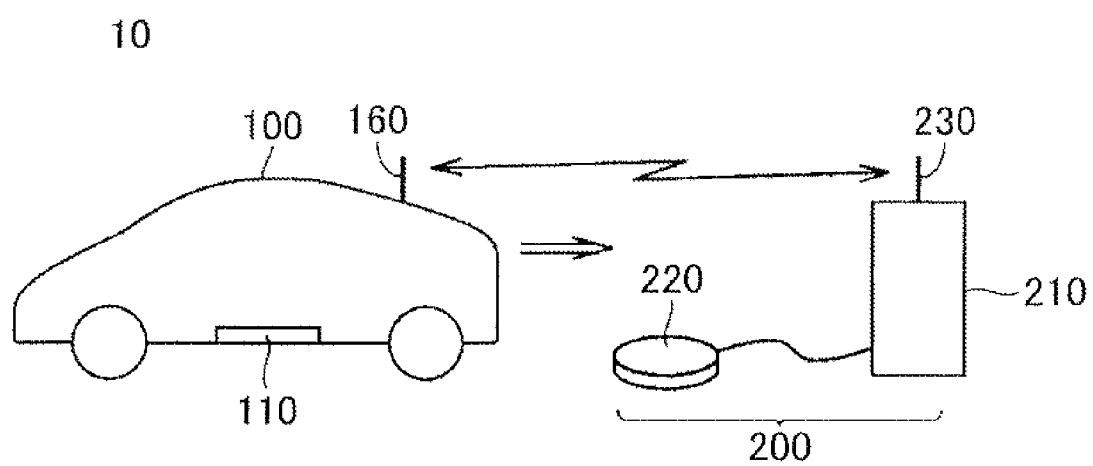
FIG. 1 is an overall configuration view of a vehicle power supply system according to an embodiment of the invention.

Hereinafter, embodiments of the invention will be described in detail with reference to the accompanying drawings. Note that like reference numerals denote the same or corresponding components in the drawings, and the description thereof is not repeated.

The configuration of a contactless power supply system will be described. FIG. 1 is an overall configuration diagram of a vehicle power supply system (contactless power supply system) 10 according to the embodiment of the invention. As shown in FIG. 1, the vehicle power supply system 10 includes a vehicle 100 and a power transmitting device 200. The vehicle 100 includes a power receiving device. The power receiving device includes a power receiving unit 110, a communication unit 160 and a control unit 300. The power transmitting device 200 includes a power supply device 210, a power transmitting unit 220, and a communication unit 230.

The power receiving unit 110 is, for example, installed at a vehicle body bottom face, and contactlessly receives high-frequency alternating-current power via an electromagnetic field. The high-frequency alternating-current power is output from the power transmitting unit 220 of the power transmitting device 200. Note that the configuration of the power receiving unit 110 will be described later together with the configuration of the power transmitting unit 220 and power transfer from the power transmitting unit 220 to the power receiving unit 110. The communication unit 160 is a communication interface by which the vehicle 100 communicates with the power transmitting device 200.

The power supply device 210 of the power transmitting device 200 generates alternating-current power having a predetermined frequency. For example, the power supply device 210 generates high-frequency alternating-current power upon reception of electric power from a system power supply (not shown), and supplies the generated alternating-current power to the power transmitting unit 220.

The power transmitting unit 220 is installed at a floor face of a parking lot, and receives high-frequency alternating-current power supplied from the power supply device 210. Then, the power transmitting unit 220 contactlessly outputs electric power to the power receiving unit 110 of the vehicle 100 via an electromagnetic field that is generated around the power transmitting unit 220. Note that the detailed configuration of the power transmitting unit 220 will also be described later together with the configuration of the power receiving unit 110 and power transfer from the power transmitting unit 220 to the power receiving unit 110. The communication unit 230 is a communication interface by which the power transmitting device 200 communicates with the vehicle 100.

In the vehicle power supply system 10, electric power is contactlessly transferred from the power transmitting unit 220 of the power transmitting device 200 to the power receiving unit 110 of the vehicle 100.

Figure 2:
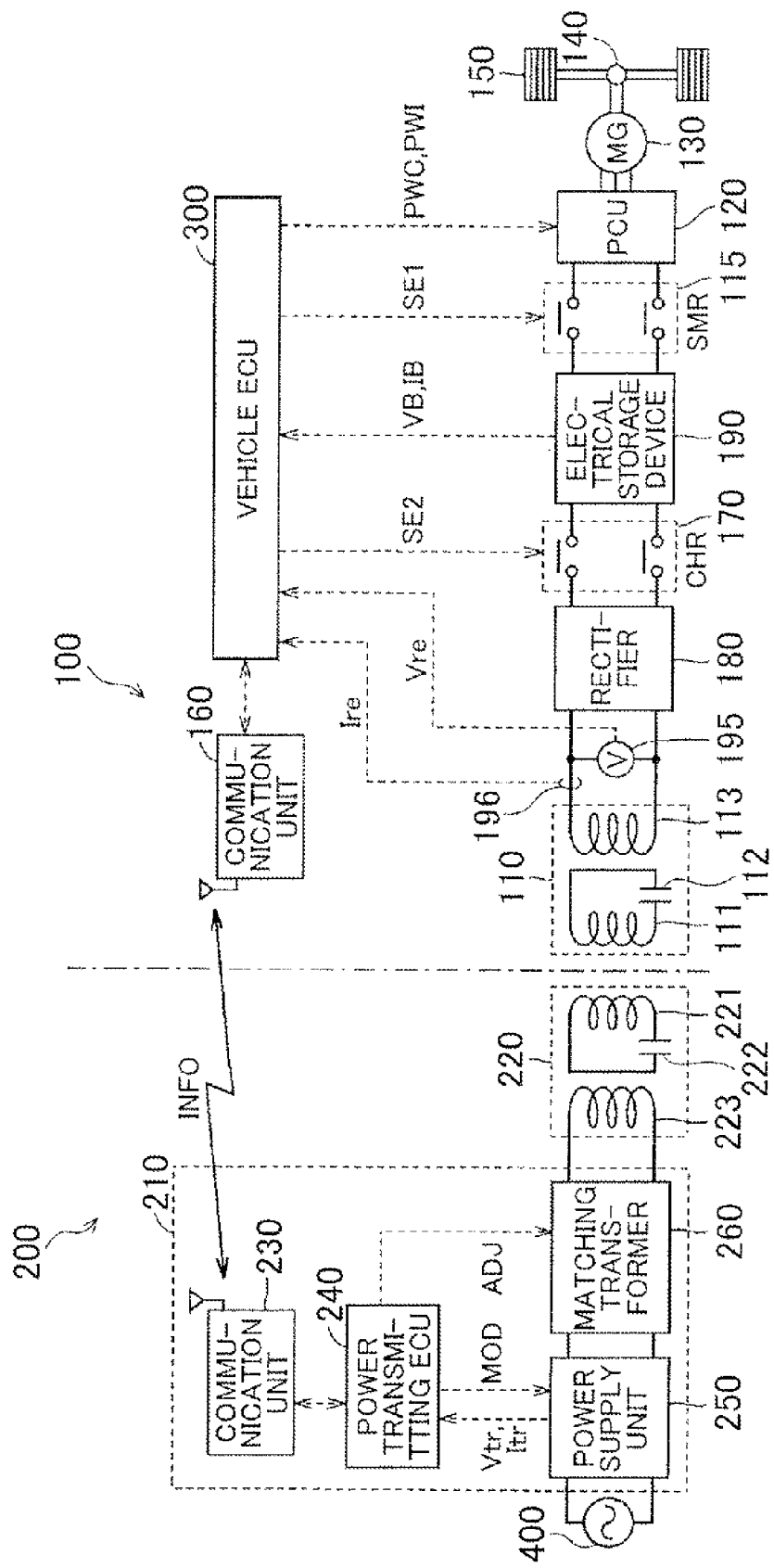
FIG. 2 is a functional block diagram that illustrates the detailed configuration of a vehicle and power transmitting device shown in FIG. 1.

FIG. 2 is a detailed configuration diagram of the vehicle power supply system 10 shown in FIG. 1. As shown in FIG. 2, the power transmitting device 200 includes the power supply device 210 and the power transmitting unit 220 as described above. The power supply device 210 further includes a power transmitting ECU 240, a power supply unit 250 and a matching transformer 260 in addition to the communication unit 230. The power transmitting ECU 240 serves as a control unit. The power transmitting unit 220 includes a resonance coil 221, a capacitor 222 and an electromagnetic induction coil 223.

The power supply unit 250 is controlled by a control signal MOD from the power transmitting ECU 240, and converts electric power, received from the alternating-current power supply, such as a commercial power supply 400, to high-frequency electric power. Then, the power supply unit 250 supplies the converted high-frequency electric power to the electromagnetic induction coil 223 via the matching transformer 260.

The power supply unit 250 outputs a power transmission voltage Vtr that is detected by a voltage sensor (not shown) and a power transmission current Itr that is detected by a current sensor (not shown) to the power transmitting ECU 240.

The matching transformer 260 is a circuit for matching impedance between the power transmitting device 200 and the vehicle 100. The matching transformer 260 is provided between the power supply unit 250 and the power transmitting unit 220, and is able to change the impedance of its circuit. The matching transformer 260 may be selectively formed. As an example, the matching transformer 260 is formed of a variable capacitor and a coil (not shown), and is able to change the impedance by changing the capacitance of the variable capacitor. By changing the impedance in the matching transformer 260, it is possible to match the impedance of the power transmitting device 200 with the impedance of the vehicle 100 (impedance matching). Note that, in FIG. 2, the matching transformer 260 is provided separately from the power supply unit 250; instead, the power supply unit 250 may include the function of the matching transformer 260.

The resonance coil 221 contactlessly transfers electric power to a resonance coil 111 included in the power receiving unit 110 of the vehicle 100. Note that power transfer between the power receiving unit 110 and the power transmitting unit 220 will be described later with reference to FIG. 3.

As described above, the communication unit 230 is a communication interface for carrying out wireless communication between the power transmitting device 200 and the vehicle 100. The communication unit 230 exchanges information INFO with the communication unit 160. The communication unit 230 receives vehicle information and a signal, or the like, for instructions to start or stop transmission of electric power, which is transmitted from the communication unit 160 of the vehicle 100, and outputs the received pieces of information to the power transmitting ECU 240. The communication unit 230 transmits information, which includes the power transmission voltage Vtr and the power transmission current Itr from the power transmitting ECU 240, to the vehicle 100.

The power transmitting ECU 240 includes a central processing unit (CPU), a storage device and an input/output buffer (which are not shown in FIG. 1). The power transmitting ECU 240 receives signals from sensors, or the like, and outputs control signals to various devices to thereby control various devices in the power supply device 210. Note that control over the vehicle 100 and the devices are not only limited to processing by software but may also be processed by exclusive hardware (electronic circuit).

The vehicle 100 includes a charging relay (CHR) 170, a rectifier 180, an electrical storage device 190, a system main relay (SMR) 115, a power control unit (PCU) 120, a motor generator 130, a power transmission gear 140, drive wheels 150, a vehicle electronic control unit (ECU) 300 that serves as a control unit, a voltage sensor 195 and a current sensor 196 in addition to the power receiving unit 110 and the communication unit 160. The power receiving unit 110 includes the resonance coil 111, a capacitor 112 and an electromagnetic induction coil 113. Note that an electric load device 118 (see FIG. 3) is an electrical device that utilizes electric power received by the power receiving unit 110, and specifically collectively indicates electrical devices downstream of the rectifier 180 (FIG. 2).

In the present embodiment, an electric vehicle is, for example, described as the vehicle 100; however, the configuration of the vehicle 100 is not limited to the electric vehicle as long as the vehicle is able to run using electric power stored in the electrical storage device. Another example of the vehicle 100 includes a hybrid vehicle equipped with an engine, a fuel cell vehicle equipped with a fuel cell, and the like.

The resonance coil 111 contactlessly receives electric power from the resonance coil 221 included in the power transmitting device 200.

The rectifier 180 rectifies alternating-current power received from the electromagnetic induction coil 113, and outputs the rectified direct-current power to the electrical storage device 190 via the CHR 170. The rectifier 180 may be, for example, formed to include a diode bridge and a smoothing capacitor (both are not shown). The rectifier 180 may be a so-called switching regulator that rectifies alternating current using switching control. When the rectifier 180 is included in the power receiving unit 110, in order to prevent erroneous operation, or the like, of switching elements caused by a generated electromagnetic field, the rectifier 180 is desirably a static rectifier, such as a diode bridge.

The CHR 170 is electrically connected to the rectifier 180 and the electrical storage device 190. The CHR 170 is controlled by a control signal SE2 from the vehicle ECU 300, and switches between supply and interruption of electric power from the rectifier 180 to the electrical storage device 190.

The electrical storage device 190 is an electric power storage element that is configured to be chargeable and dischargeable. The electrical storage device 190 is, for example, fanned of a secondary battery, such as a lithium ion battery, a nickel-metal hydride battery and a lead-acid battery, or an electrical storage element, such as an electric double layer capacitor.

The electrical storage device 190 is connected to the rectifier 180. The electrical storage device 190 stores electric power that is received by the power receiving unit 110 and rectified by the rectifier 180. In addition, the electrical storage device 190 is also connected to the PCU 120 via the SMR 115. The electrical storage device 190 supplies electric power for generating vehicle driving force to the PCU 120. Furthermore, the electrical storage device 190 stores electric power generated by the motor generator 130. The output of the electrical storage device 190 is, for example, about 200 V.

Although not shown in FIG. 2, when a power receiving voltage differs from a charging voltage of the electrical storage device 190, a power converter, such a DC-DC converter, may be provided between the rectifier 180 and the electrical storage device 190. In addition, as in the case of the power transmitting device 200, a matching transformer for carrying out impedance matching may be provided.

A voltage sensor and a current sensor (both are not shown) are provided for the electrical storage device 190. The voltage sensor is used to detect the voltage VB of the electrical storage device 190. The current sensor is used to detect a current IB that is input to or output from the electrical storage device 190. These detected values are output to the vehicle ECU 300. The vehicle ECU 300 computes the state of charge (also referred to as "SOC") of the electrical storage device 190 on the basis of the voltage VB and the current IB.

The SMR 115 is electrically connected between the electrical storage device 190 and the PCU 120. Then, the SMR 115 is controlled by a control signal SE1 from the vehicle ECU 300, and switches between supply and interruption of electric power between the electrical storage device 190 and the PCU 120.

The PCU 120 includes a converter and an inverter (both are not shown). The converter is controlled by a control signal PWC from the vehicle ECU 300, and converts voltage from the electrical storage device 190. The inverter is controlled by a control signal PWI from the vehicle ECU 300, and drives the motor generator 130 using electric power converted by the converter.

The motor generator 130 is an alternating-current rotating electrical machine, and is, for example, a permanent-magnet synchronous motor that includes a rotor in which a permanent magnet is embedded. The output torque of the motor generator 130 is transmitted to the drive wheels 150 via the power transmission gear 140. The vehicle 100 travels using the transmitted torque. The motor generator 130 is able to generate electric power using the rotational force of the drive wheels 150 during regenerative braking operation of the vehicle 100. Then, the generated electric power is converted by the PCU 120 to charging electric power to charge the electrical storage device 190.

In addition, in a hybrid vehicle equipped with an engine (not shown) in addition to the motor generator 130, the engine and the motor generator 130 are cooperatively operated to generate required vehicle driving force. In this case, the electrical storage device 190 may be charged with electric power generated from the rotation of the engine.

As described above, the communication unit 160 is a communication interface for carrying out wireless communication between the vehicle 100 and the power transmitting device 200. The communication unit 160 exchanges information INFO with the communication unit 230 of the power transmitting device 200. The information INFO that is output from the communication unit 160 to the power transmitting device 200 includes vehicle information from the vehicle ECU 300 and a signal for instructions to start or stop transmission of electric power.

The vehicle ECU 300 includes a CPU, a storage unit and an input/output buffer, which are not shown in FIG. 1. The vehicle ECU 300 receives signals from the sensors, and the like, outputs control signals to the devices, and controls the devices in the vehicle 100. Note that control over the vehicle 100 and the devices are not only limited to processing by software but may also be processed by exclusive hardware (electronic circuit).

The voltage sensor 195 is connected in parallel with the electromagnetic induction coil 113, and detects a power receiving voltage Vre received by the power receiving unit 110. The current sensor 196 is provided in a power line that connects the electromagnetic induction coil 113 to the rectifier 180, and detects a power receiving current Ire. The detected power receiving voltage Vre and power receiving current Ire are transmitted to the vehicle ECU 300, and is used to, for example, compute a power transfer efficiency.

Note that, in FIG. 2, the power receiving unit 110 and the power transmitting unit 220 respectively include the electromagnetic induction coils 113 and 223; instead, the power receiving unit 110 and the power transmitting unit 220 respectively may not include the electromagnetic induction coils 113 and 223. In this case, although not shown in FIG. 2, the resonance coil 221 is connected to the matching transformer 260 in the power transmitting unit 220, and the resonance coil 111 is connected to the rectifier 180 in the power receiving unit 110.

Figure 3:
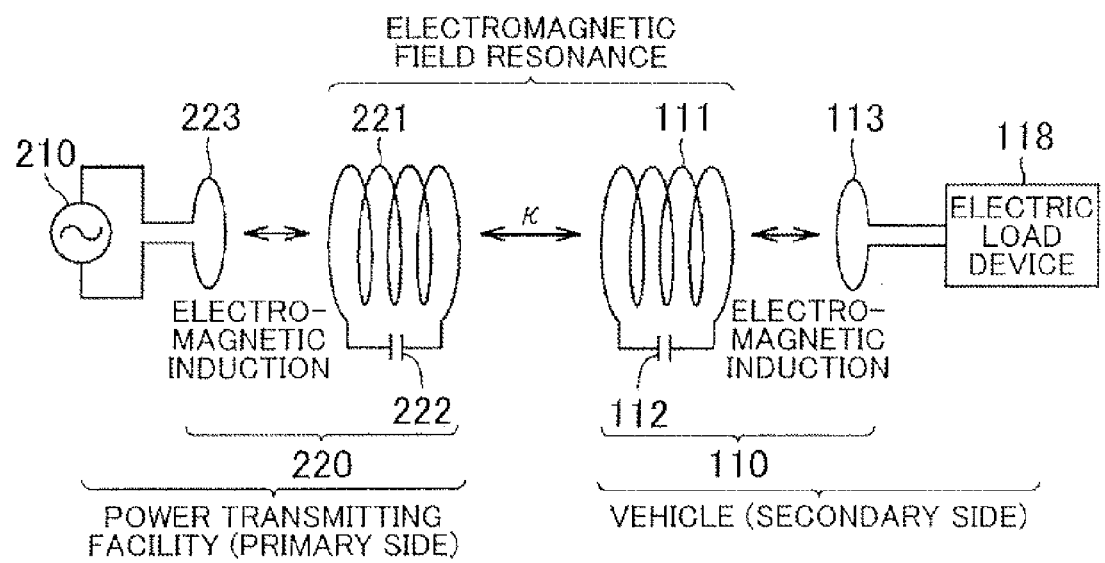
FIG. 3 is an equivalent circuit diagram at the time of power transfer from the power transmitting device to the vehicle in FIG. 2.

Next, the principle of power transfer will be described. FIG. 3 is an equivalent circuit diagram at the time of power transfer from the power transmitting device 200 to the vehicle 100. As shown in FIG. 3, the power transmitting unit 220 of the power transmitting device 200 includes the resonance coil 221, the capacitor 222 and the electromagnetic induction coil 223.

The electromagnetic induction coil 223 is, for example, provided substantially coaxially with the resonance coil 221 at a predetermined gap from the resonance coil 221. The electromagnetic induction coil 223 is magnetically coupled to the resonance coil 221 through electromagnetic induction, and supplies high-frequency electric power, which is supplied from the power supply device 210, to the resonance coil 221 through electromagnetic induction.

The resonance coil 221 forms an LC resonance circuit together with the capacitor 222. Note that, as will be described later, an LC resonance circuit is also formed in the power receiving unit 110 of the vehicle 100. The difference between the natural frequency of the LC resonance circuit formed of the resonance coil 221 and the capacitor 222 and the natural frequency of the LC resonance circuit of the power receiving unit 110 is smaller than or equal to ±10% of the natural frequency of any one of the former LC resonance circuit and the latter LC resonance circuit. Then, the resonance coil 221 receives electric power from the electromagnetic induction coil 223 through electromagnetic induction, and contactlessly transmits electric power to the power receiving unit 110 of the vehicle 100.

The electromagnetic induction coil 223 is provided in order to easily supply electric power from the power supply device 210 to the resonance coil 221. The power supply device 210 may be directly connected to the resonance coil 221 without providing the electromagnetic induction coil 223. In addition, the capacitor 222 is provided in order to adjust the natural frequency of the resonance circuit. When a desired natural frequency is obtained by utilizing the stray capacitance of the resonance coil 221, it is not necessary to provide the capacitor 222.

The power receiving unit 110 of the vehicle 100 includes the resonance coil 111, the capacitor 112 and the electromagnetic induction coil 113. The resonance coil 111 forms an LC resonance circuit together with the capacitor 112. As described above, the difference between the natural frequency of the LC resonance circuit formed of the resonance coil 111 and the capacitor 112 and the natural frequency of the LC resonance circuit formed of the resonance coil 221 and the capacitor 222 in the power transmitting unit 220 of the power transmitting device 200 is smaller than or equal to ±10% of the natural frequency of any one of the former LC resonance circuit and the latter LC resonance circuit. The resonance coil 111 contactlessly receives electric power from the power transmitting unit 220 of the power transmitting device 200.

The electromagnetic induction coil 113 is, for example, provided substantially coaxially with the resonance coil 111 at a predetermined gap from the resonance coil 111. The electromagnetic induction coil 113 is magnetically coupled to the resonance coil 111 through electromagnetic induction, extracts electric power, received by the resonance coil 111, through electromagnetic induction, and outputs the extracted electric power to the electric load device 118.

The electromagnetic induction coil 113 is provided in order to easily extract electric power from the resonance coil 111. The rectifier 180 may be directly connected to the resonance coil 111 without providing the electromagnetic induction coil 113. In addition, the capacitor 112 is provided in order to adjust the natural frequency of the resonance circuit. When a desired natural frequency is obtained by utilizing the stray capacitance of the resonance coil 111, it is not necessary to provide the capacitor 112.

In the power transmitting device 200, high-frequency alternating-current power is supplied from the power supply device 210 to the electromagnetic induction coil 223, and electric power is supplied from the electromagnetic induction coil 223 to the resonance coil 221. By so doing, energy (electric power) is transferred from the resonance coil 221 to the resonance coil 111 through a magnetic field formed between the resonance coil 221 and the resonance coil 111 of the vehicle 100. Energy (electric power) transferred to the resonance coil 111 is extracted with the use of the electromagnetic induction coil 113, and is transferred to the electric load device 118 of the vehicle 100.

As described above, in the power transfer system, the difference between the natural frequency of the power transmitting unit 220 of the power transmitting device 200 and the natural frequency of the power receiving unit 110 of the vehicle 100 is smaller than or equal to ±10% of the natural frequency of one of the power transmitting unit 220 and the power receiving unit 110. By setting the natural frequency of each of the power transmitting unit 220 and the power receiving unit 110 within the above range, it is possible to increase the power transfer efficiency. On the other hand, when the above-described difference in natural frequency is larger than ±10%, the power transfer efficiency becomes lower than 10%, so there may occur an inconvenience, such as an increase in the duration of a power transfer time.

Note that the natural frequency of the power transmitting unit 220 (power receiving unit 110) means an oscillation frequency in the case where the electric circuit (resonance circuit) that constitutes the power transmitting unit 220 (power receiving unit 110) freely oscillates. Note that, in the electric circuit (resonance circuit) that constitutes the power transmitting unit 220 (power receiving unit 110), the natural frequency at the time when braking force or electrical resistance is substantially zero is also called the resonance frequency of the power transmitting unit 220 (power receiving unit 110).

Figure 4:
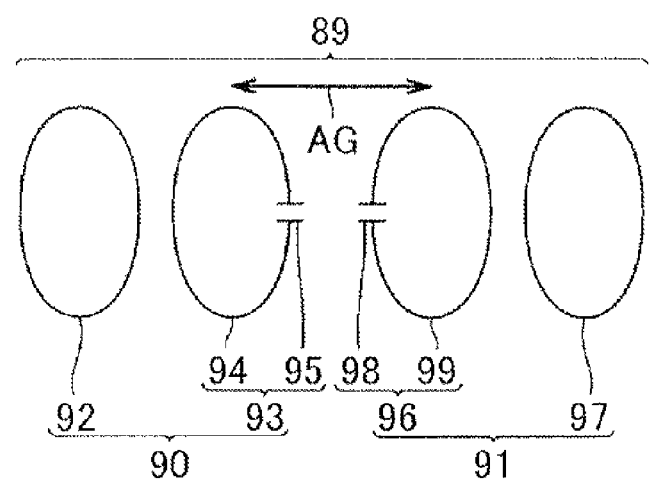
FIG. 4 is a view that shows a simulation model of a power transfer system.
Figure 5:
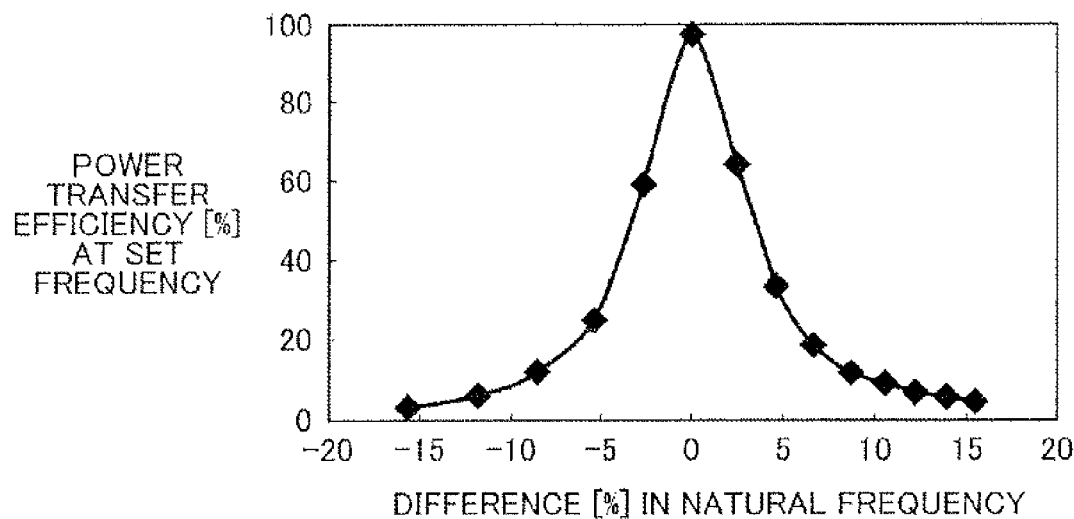
FIG. 5 is a graph that shows the correlation between a difference in natural frequency of each of a power transmitting unit and a power receiving unit and a power transfer efficiency.

The simulation result obtained by analyzing the correlation between a difference in natural frequency and a power transfer efficiency will be described with reference to FIG. 4 and FIG. 5. FIG. 4 is a view that shows a simulation model of a power transfer system; In addition, FIG. 5 is a graph that shows the correlation between a difference in the natural frequency of each of the power transmitting unit and the power receiving unit and a power transfer efficiency.

As shown in FIG. 4, the power transfer system 89 includes a power transmitting unit 90 and a power receiving unit 91. The power transmitting unit 90 includes a first coil 92 and a second coil 93. The second coil 93 includes a resonance coil 94 and a capacitor 95 that is provided in the resonance coil 94. The power receiving unit 91 includes a third coil 96 and a fourth coil 97. The third coil 96 includes a resonance coil 99 and a capacitor 98 that is connected to the resonance coil 99.

The inductance of the resonance coil 94 is set to Lt, and the capacitance of the capacitor 95 is set to C1. In addition, the inductance of the resonance coil 99 is set to Lr, and the capacitance of the capacitor 98 is set to C2. When the parameters are set in this way, the natural frequency f1 of the second coil 93 is expressed by the following mathematical expression (1), and the natural frequency f2 of the third coil 96 is expressed by the following mathematical expression (2).

$$f1 = 1/\{2\pi(Lt \times C1)^{1/2}\} \quad (1)$$

$$f2 = 1/\{2\pi(Lr \times C2)^{1/2}\} \quad (2)$$

Here, in the case where the inductance Lr and the capacitances C1 and C2 are fixed and only the inductance Lt is varied, the correlation between a difference in natural frequency between the second coil 93 and the third coil 96 and a power transfer efficiency is shown in FIG. 5. Note that, in this simulation, a relative positional relationship between the resonance coil 94 and the resonance coil 99 is fixed, and, furthermore, the frequency of current that is supplied to the second coil 93 is constant.

As shown in FIG. 5, the abscissa axis represents a difference Df (%) in natural frequency, and the ordinate axis represents a power transfer efficiency (%) with a current having a set frequency. The difference Df (%) in natural frequency is expressed by the following mathematical expression (3).

$$\text{(Difference in Natural Frequency)} = \{(f1-f2)/f2\} \times 100 \text{ (\%)} \quad (3)$$

As is apparent from FIG. 5, when the difference (%) in natural frequency is 0%, the power transfer efficiency is close to 100%. When the difference (%) in natural frequency is ±5%, the power transfer efficiency is about 40%. When the difference (%) in natural frequency is ±10%, the power transfer efficiency is about 10%. When the difference (%) in natural frequency is ±15%, the power transfer efficiency is about 5%. That is, it is found that, by setting the natural frequency of each of the second coil 93 and the third coil 96 such that the absolute value of the difference (%) in natural frequency (difference in natural frequency) falls at or below 10% of the natural frequency of the third coil 96, it is possible to increase the power transfer efficiency to a practical level. Furthermore, by setting the natural frequency of each of the second coil 93 and the third coil 96 such that the absolute value of the difference (%) in natural frequency is smaller than or equal to 5% of the natural frequency of the third coil 96, it is possible to further increase the power transfer efficiency, so it is more desirable. Note that the electromagnetic field analyzation software application (JMAG (trademark): produced, by JSOL Corporation) is employed as a simulation software application.

Referring back to FIG. 2, the power transmitting unit 220 of the power transmitting device 200 and the power receiving unit 110 of the vehicle 100 contactlessly exchange electric power through at least one of a magnetic field and an electric field. The magnetic field is formed between the power transmitting unit 220 and the power receiving unit 110, and oscillates at a predetermined frequency. The electric field is formed between the power transmitting unit 220 and the power receiving unit 110, and oscillates at a predetermined frequency. A coupling coefficient κ between the power transmitting unit 220 and the power receiving unit 110 is desirably smaller than or equal to 0.1. By resonating the power transmitting unit 220 and the power receiving unit 110 through the electromagnetic field, electric power is transferred from the power transmitting unit 220 to the power receiving unit 110.

Here, the magnetic field having the predetermined frequency, which is formed around the power transmitting unit 220, will be described. The "magnetic field having the predetermined frequency" typically correlates with the power transfer efficiency and the frequency of current that is supplied to the power transmitting unit 220. Then, first, the correlation between the power transfer efficiency and the frequency of current that is supplied to the power transmitting unit 220 will be described. The power transfer efficiency at the time when electric power is transferred from the power transmitting unit 220 to the power receiving unit 110 varies depending on various factors, such as a distance between the power transmitting unit 220 and the power receiving unit 110. For example, the natural frequency (resonance frequency) of each of the power transmitting unit 220 and the power receiving unit 110 is set to f0, the frequency of current that is supplied to the power transmitting unit 220 is set to f3, and the air gap between the power transmitting unit 220 and the power receiving unit 110 is set to AG.

Figure 6:
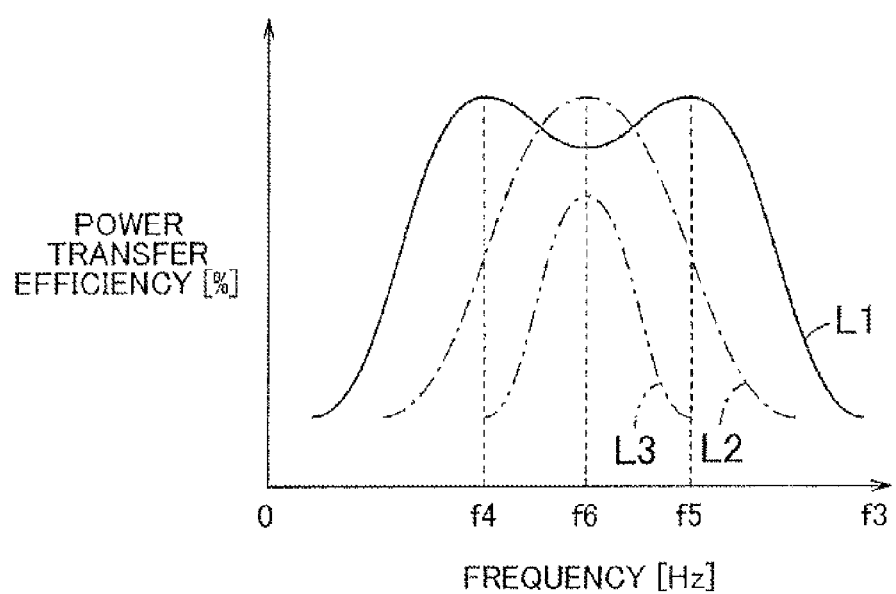
FIG. 6 is a graph that shows the correlation between a power transfer efficiency at the time when an air gap is varied and the frequency of a current that is supplied to the power transmitting unit in a state where the natural frequency is fixed in FIG. 2 and FIG. 3.

FIG. 6 is a graph that shows the correlation between a power transfer efficiency and the frequency f3 of current that is supplied to the power transmitting unit 220 at the time when the air gap AG is varied in a state where the natural frequency f0 is fixed. In FIG. 6, the abscissa axis represents the frequency f3 of current that is supplied to the power transmitting unit 220, and the ordinate axis represents a power transfer efficiency (%). An efficiency curve L1 schematically shows the correlation between a power transfer efficiency and the frequency f3 of current that is supplied to the power transmitting unit 220 when the air gap AG is small. As indicated by the efficiency curve L1, when the air gap AG is small, the peak of the power transfer efficiency appears at frequencies f4 and f5 (f4<f5). When the air gap AG is increased, two peaks at which the power transfer efficiency is high vary so as to approach each other. Then, as indicated by an efficiency curve L2, when the air gap AG is increased to be longer than a predetermined distance, the number of the peaks of the power transfer efficiency is one, the power transfer efficiency becomes a peak when the frequency of current that is supplied to the power transmitting unit 220 is f6. When the air gap AG is further increased from the state of the efficiency curve L2, the peak of the power transfer efficiency reduces as indicated by an efficiency curve L3.

For example, the following methods are conceivable as a method of improving the power transfer efficiency. In the first method, by varying the capacitances of the capacitor 222 and capacitor 112 in accordance with the air gap AG while the frequency of current that is supplied to the power transmitting unit 220 is constant, the characteristic of power transfer efficiency between the power transmitting unit 220 and the power receiving unit 110 is varied. Specifically, the capacitances of the capacitor 222 and capacitor 112 are adjusted such that the power transfer efficiency becomes a peak in a state where the frequency of current that is supplied to the power transmitting unit 220 is constant. In this method, irrespective of the size of the air gap AG, the frequency of current flowing through the power transmitting unit 220 and the power receiving unit 110 is constant. As a method of varying the characteristic of power transfer efficiency, a method of utilizing the matching transformer 260 of the power transmitting device 200, a method of utilizing a converter (not shown) provided between the rectifier 180 and the electrical storage device 190 in the vehicle 100, or the like, may be employed.

In addition, in the second method, the frequency of current that is supplied to the power transmitting unit 220 is adjusted on the basis of the size of the air gap AG. For example, when the power transfer characteristic becomes the efficiency curve L1, current having the frequency f4 or the frequency f5 is supplied to the power transmitting unit 220. When the frequency characteristic becomes the efficiency curve L2 or L3, current having the frequency f6 is supplied to the power transmitting unit 220. In this case, the frequency of current flowing through the power transmitting unit 220 and the power receiving unit 110 is varied in accordance with the size of the air gap AG.

In the first method, the frequency of current flowing through the power transmitting unit 220 is a fixed constant frequency, and, in the second method, the frequency of current flowing through the power transmitting unit 220 is a frequency that appropriately varies with the air gap AG. Through the first method, the second method, or the like, current having the predetermined frequency set such that the power transfer efficiency is high is supplied to the power transmitting unit 220. When current having the predetermined frequency flows through the power transmitting unit 220, a magnetic field (electromagnetic field) that oscillates at the predetermined frequency is formed around the power transmitting unit 220. The power receiving unit 110 receives electric power from the power transmitting unit 220 through the magnetic field that is formed between the power receiving unit 110 and the power transmitting unit 220 and that oscillates at the predetermined frequency. Thus, the "magnetic field that oscillates at the predetermined frequency" is not necessarily a magnetic field having a fixed frequency. Note that, in the above-described embodiment, the frequency of current that is supplied to the power transmitting unit 220 is set by focusing on the air gap AG; however, the power transfer efficiency also varies on the basis of other factors, such as a deviation in the horizontal position between the power transmitting unit 220 and the power receiving unit 110, so the frequency of current that is supplied to the power transmitting unit 220 may possibly be adjusted on the basis of those other factors.

The above description is made on the example in which a helical coil is employed as each resonance coil; however, when an antenna, such as a meander line antenna, is employed as each resonance coil, current having the predetermined frequency flows through the power transmitting unit 220, and, therefore, an electric field having the predetermined frequency is formed around the power transmitting unit 220. Then, through the electric field, electric power is transferred between the power transmitting unit 220 and the power receiving unit 110.

In the power transfer system, a near field (evanescent field) in which the electrostatic field of an electromagnetic field is dominant is utilized. By so doing, power transmitting and power receiving efficiencies are improved.

Figure 7:
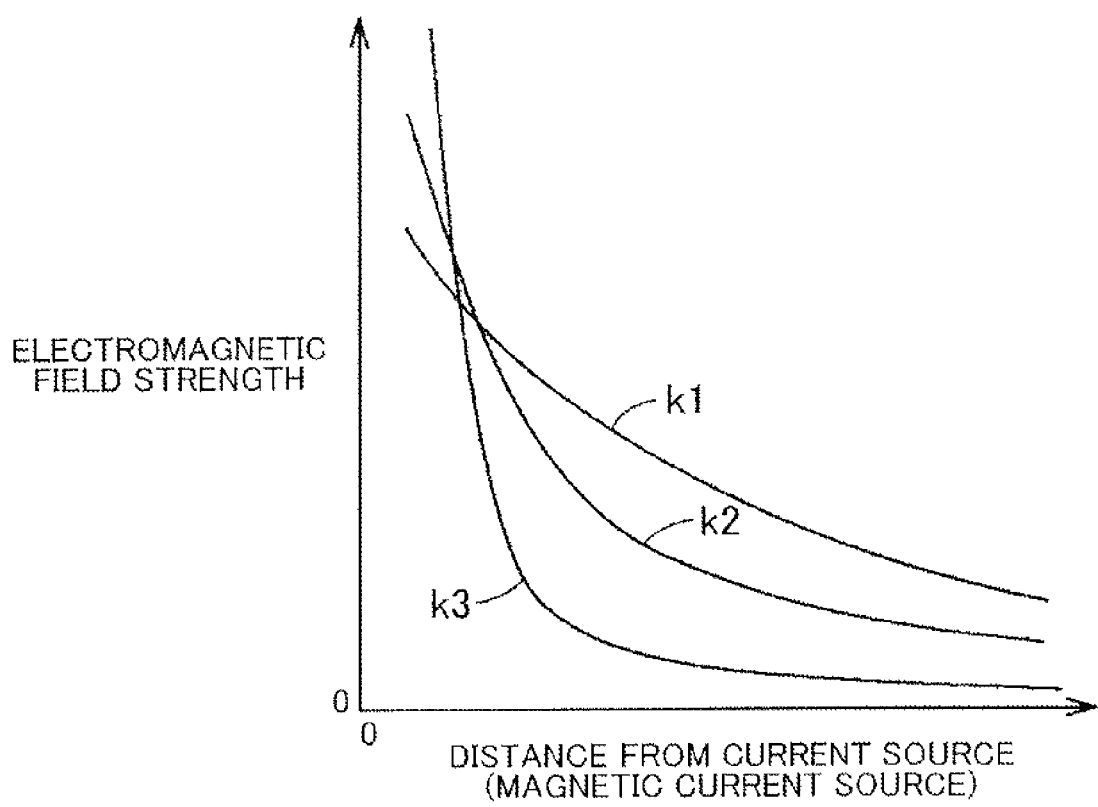
FIG. 7 is a graph that shows the correlation between a distance from a current source (magnetic current source) and the strength of an electromagnetic field in FIG. 2 and FIG. 3.

FIG. 7 is a graph that shows the relationship between the distance from a current source (magnetic current source) and the strength of electromagnetic field. As shown in FIG. 7, the electromagnetic field consists of three components. The curve k1 is a component that is inversely proportional to the distance from a wave source, and is called radiation electromagnetic field. The curve k2 is a component that is inversely proportional to the square of the distance from the wave source, and is called induction electromagnetic field. In addition, the curve k3 is a component inversely proportional to the cube of a distance from a wave source, and is referred to as "static electromagnetic field". Where the wavelength of the electromagnetic field is $\lambda$, a distance at which the strengths of the radiation electromagnetic field, induction electromagnetic field and static electromagnetic field are substantially equal to one another may be expressed as $\lambda/2\pi$.

The static electromagnetic field is a region in which the strength of electromagnetic field steeply reduces with a distance from a wave source, and, in the power transfer system according to the present embodiment, a near field (evanescent field) in which the static electromagnetic field is dominant is utilized to transfer energy (electric power). That is, by resonating the power transmitting unit 220 and the power receiving unit 110 (for example, a pair of LC resonance coils) having the close natural frequencies in the near field in which the static electromagnetic field is dominant, energy (electric power) is transferred from the power transmitting unit 220 to the other power receiving unit 110. The static electromagnetic field does not propagate energy over a long distance, so the resonance method is able to transmit electric power with less loss of energy in comparison with an electromagnetic wave that transmits energy (electric power) through the radiation electromagnetic field that propagates energy over a long distance.

In this way, in the power transfer system, by resonating the power transmitting unit 220 and the power receiving unit 110 through the electromagnetic field, electric power is contactlessly transferred between the power transmitting unit 220 and the power receiving unit 110. Such an electromagnetic field that is formed between the power receiving unit 110 and the power transmitting unit 220 may be, for example, called a near field resonance coupling field. Then, a coupling coefficient κ between the power transmitting unit 220 and the power receiving unit 110 is, for example, smaller than or equal to about 0.3, and is desirably smaller than or equal to 0.1. Of course, the coupling coefficient κ that ranges from about 0.1 to 0.3 may also be employed. The coupling coefficient κ is not limited to such values; it may be various values at which power transfer is good.

Note that coupling between the power transmitting unit 220 and the power receiving unit 110 in power transfer is, for example, called magnetic resonance coupling, magnetic field resonance coupling, near field resonance coupling, electromagnetic field resonance coupling or electric field resonance coupling. The electromagnetic field resonance coupling means coupling that includes the magnetic resonance coupling, the magnetic field resonance coupling and the electric field resonance coupling.

When the power transmitting unit 220 and the power receiving unit 110 are formed of coils as described above, the power transmitting unit 220 and the power receiving unit 110 are mainly coupled through a magnetic field, and magnetic resonance coupling or magnetic field resonance coupling is formed. For example, an antenna, such as a meander line antenna, may be employed as each of the power transmitting unit 220 and the power receiving unit 110. In this case, the power transmitting unit 220 and the power receiving unit 110 are mainly coupled through an electric field, and electric field resonance coupling is formed.

In the thus configured vehicle power supply system that contactlessly transfers electric power, no wire connection for power transfer is provided between the power transmitting device and the vehicle, so, in many cases, as described above, information is also transmitted through wireless communication between the power transmitting device and the power receiving device.

For example, when such a vehicle power supply system is provided in a plurality of adjacent parking spaces, such as a parking lot of a commercial facility, at least one of a vehicle and a power transmitting device may have a spatially wide communication range. This is to guide a vehicle so that the vehicle can recognize a usable power transmitting device or to transmit the facility specifications of the power transmitting device and vehicle to inform a user in advance whether the specifications of the power transmitting device are suitable for the vehicle.

Figure 8:
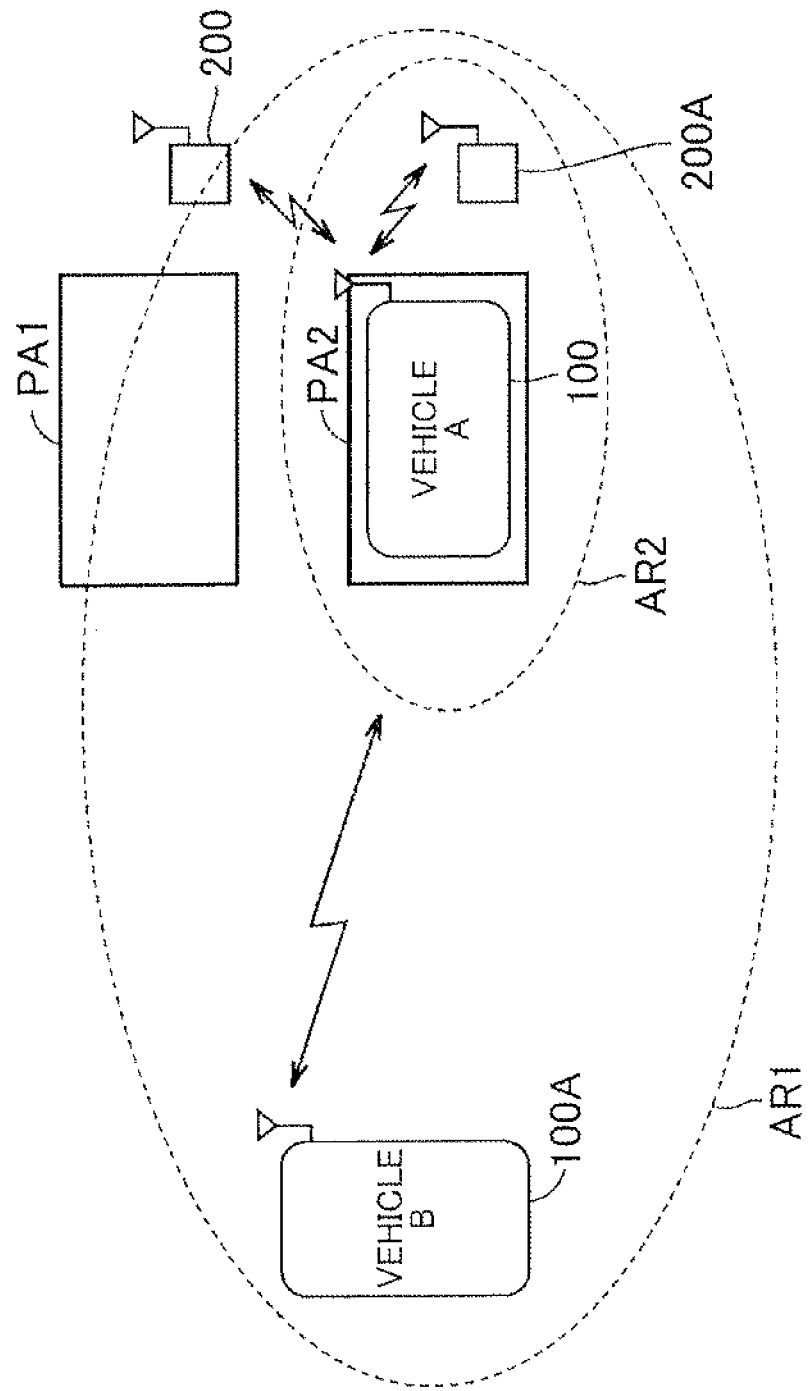
FIG. 8 is a view for illustrating the outline of communication range switching control according to the embodiment.

However, on the other hand, when such wide-area communication is carried out, there is a problem as shown in FIG. 8. As shown in FIG. 8, for example, adjacent parking spaces PA1 and PA2 each having the vehicle power supply system described in FIG. 1 are assumed. The power transmitting device 200 is provided in the parking space PA1, and a power transmitting device 200A is provided in the parking space PA2. Then, it is assumed that the vehicle 100 (vehicle A) is parked in the parking space PA2. At this time, when the communication range of the power transmitting device 200A is wide, the power transmitting device 200A can communicate with not only the vehicle A but also the vehicle 100A (vehicle B) that is not present in the parking space PA2.

Alternatively, when the communication range of the vehicle A is wide, the vehicle A that is parked in the parking space PA2 can communicate with not only the power transmitting device 200A but also the power transmitting device 200 of the adjacent parking space PA1.

In this way, when a power transmitting device is able to communicate with a plurality of vehicles or when a vehicle is able to communicate with a plurality of power transmitting devices, it may not be possible to correctly identify a vehicle to which the power transmitting device should transmit electric power or it may not be possible to correctly identify a power transmitting device from which the vehicle should receive electric power, so correct pairing may not be performed.

In this state, for example, the power transmitting device 200A of the parking space PA2 in FIG. 8 may transmit electric power to the vehicle A on the basis of information about the vehicle B that is not an intended power transmission target or the vehicle A that is parked in the parking space PA2 may require the power transmitting device 200 of the adjacent parking space PA1 to transmit electric power. By so doing, there is a possibility that a vehicle is not appropriately charged or pieces of accounting information of mutually adjacent vehicles are interchanged.

In the present embodiment, by executing communication range switching control for appropriately switching the communication range of the communication unit in a vehicle and/or the communication unit in a power transmitting device between a wide-area communication range and a narrow-area communication range, a disagreement in recognition between the vehicle and the power transmitting device is prevented.

Specifically, for example, in FIG. 8, when the communication range of each of the vehicles A and B is fixed to a relatively narrow communication range and the communication range of each of the power transmitting devices 200 and 200A is set so as to be wide, the communication range of each power transmitting device is switched between a range AR1 that is the wide-area communication range and a range AR2 that is the narrow-area communication range. Then, when the vehicle A is parked in the parking space PA2, the communication range of the power transmitting device 200A is switched to the narrow-area communication range AR2. Thus, the power transmitting device 200A is able to communicate with only the vehicle A.

Figure 9:
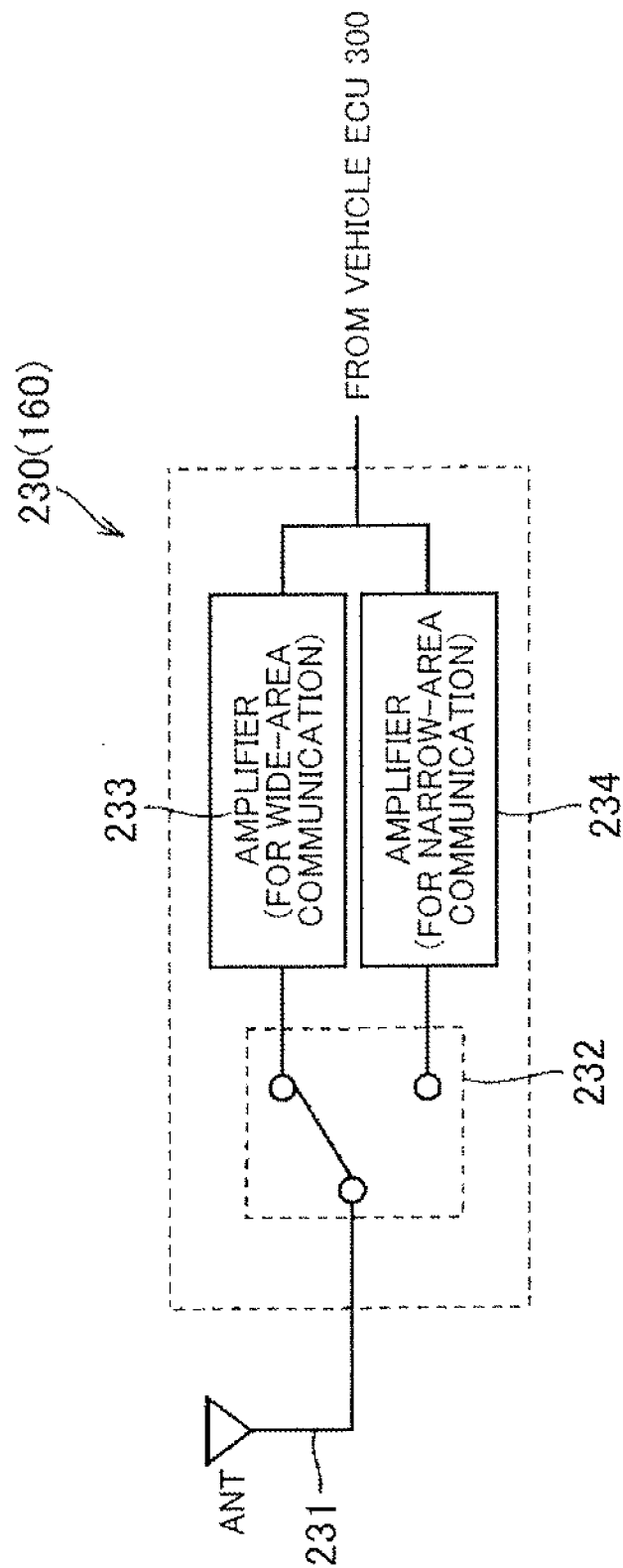
FIG. 9 is a view that shows an example of a configuration for switching a communication range in a communication unit according to the embodiment.

FIG. 9 is a view that shows an example of a configuration for switching the communication range in the communication unit 230 of the power transmitting device 200. The communication unit 230 includes an antenna 231, a switching unit 232, a wide-area communication amplifier 233 and a narrow-area communication amplifier 234. Each of the amplifiers 233 and 234 receives a signal about information to be transmitted to the power transmitting device 200 from the vehicle ECU 300 (FIG. 2), and amplifies the signal by a predetermined gain. The amplified signal is modulated into a predetermined frequency in a modulation circuit (not shown), and is transmitted via the antenna 231.

The gain of the amplifier 233 is set so as to be larger than the gain of the amplifier 234. Therefore, a signal amplified by the amplifier 233 can reach a wider range than a signal amplified by the amplifier 234.

The switching unit 232 is controlled by the power transmitting ECU 240, and connects one of the amplifier 233 and the amplifier 234 to the antenna 231.

By configuring the communication unit 230 in this way, it is possible to switch the communication range between wide-area communication range and narrow-area communication range as needed.

The above description is made on the example in which a signal is transmitted. When a signal is received as well, it is possible to switch a receivable range by switching the amplifier that amplifies a receiving signal. FIG. 9 shows the example in which the communication range is switched by changing the output gain of the amplifier. The communication range may be switched by another method, and, for example, the frequency of an output signal may be changed in addition to the output gain.

Figure 10:
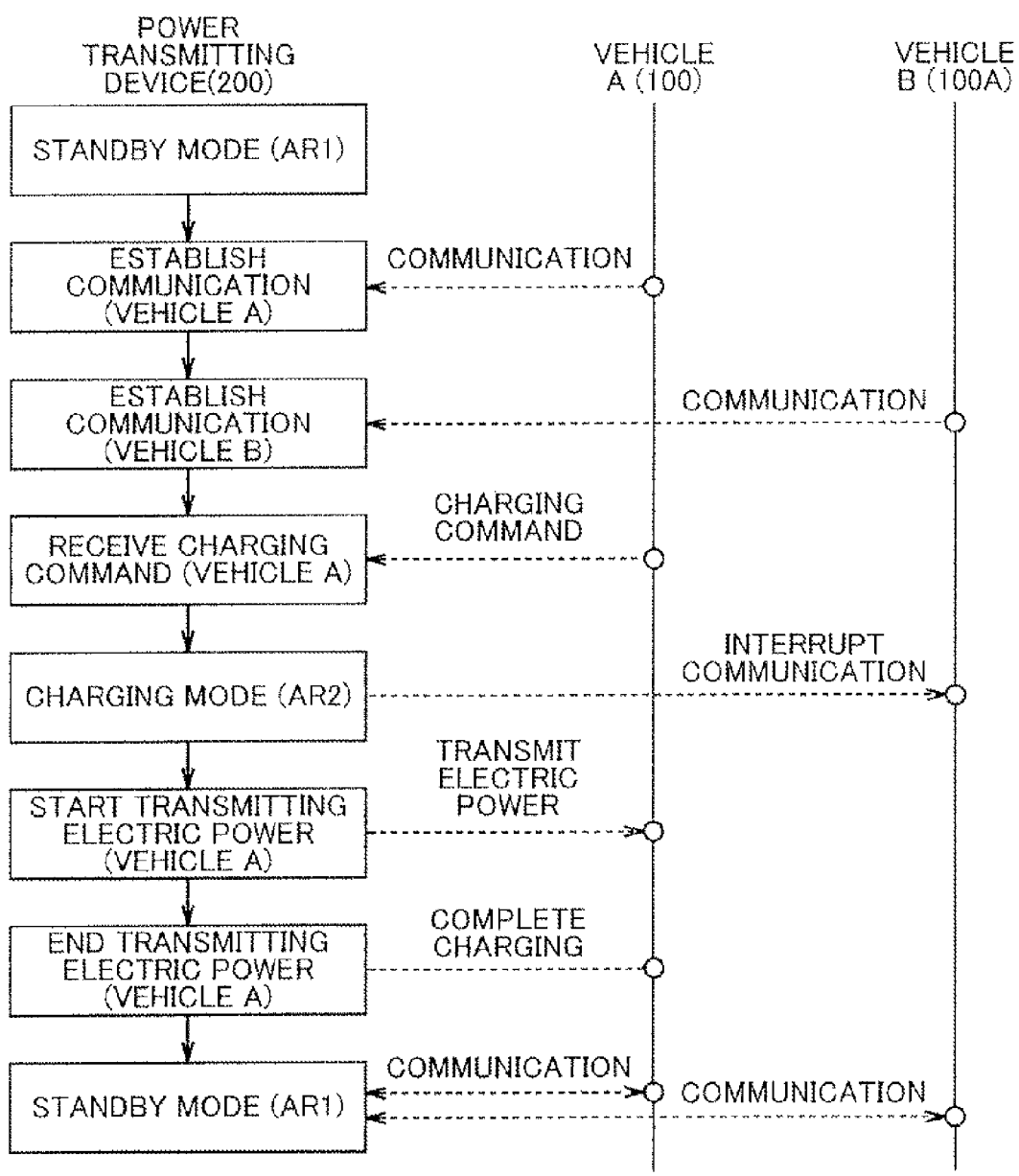
FIG. 10 is a view for illustrating a schematic communication sequence according to a first embodiment.

Hereinafter, the details of communication range switching control will be described. FIG. 10 is a view for illustrating a schematic communication sequence according to a first embodiment. In the first embodiment, the communication range of the power transmitting device is switched. In FIG. 10, description will be made on an example in which the power transmitting device 200 communicates with the vehicle A and the vehicle B and supplies electric power to the vehicle A.

As shown in FIG. 10, schematic processes in the power transmitting device 200 are shown at the left side of FIG. 10. In addition, communication details with each vehicle in the individual processes of the power transmitting device 200 are shown at the right side of FIG. 10.

When the power transmitting device 200 is not supplying electric power to a vehicle, the operation mode is set to a standby mode, and carries out wide-area communication by which it is possible to communicate with a vehicle that is present within the communication range AR1 shown in FIG. 8.

In the standby mode, when the vehicle A and the vehicle B are present within the communication range, the power transmitting device 200 establishes communication with both the vehicles.

Then, when one of the vehicles (vehicle A in FIG. 10) approaches the parking space in which the power transmitting device 200 is provided and, in addition, the power transmitting device 200 receives a charging request from the vehicle A through user's operation, the power transmitting device 200 is switched to a charging mode, and switches the communication range to the narrow-area communication range AR2.

By so doing, the power transmitting device 200 is not able to communicate with the far-side vehicle B, and is able to communicate with only the vehicle A.

After that, the power transmitting device 200 transmits electric power to the vehicle A while maintaining communication with the vehicle A. As charging of the electrical storage device has been completed in the vehicle A, the power transmitting device 200 stops transmitting electric power to the vehicle A. After that, the power transmitting device 200 is switched to the standby mode again, and switches the communication range to the wide-area communication range.

The timing at which communication is switched from narrow-area communication to wide-area communication is not limited to the timing after completion of charging as described above. For example, communication may be switched to wide-area communication once pairing between the power transmitting device and the vehicle is established. In this case, for example, while electric power is being transmitted to the vehicle, information about a period of time until transmission of electric power to the vehicle is completed, or the like, may be transmitted to another vehicle in advance.

Figure 11A:
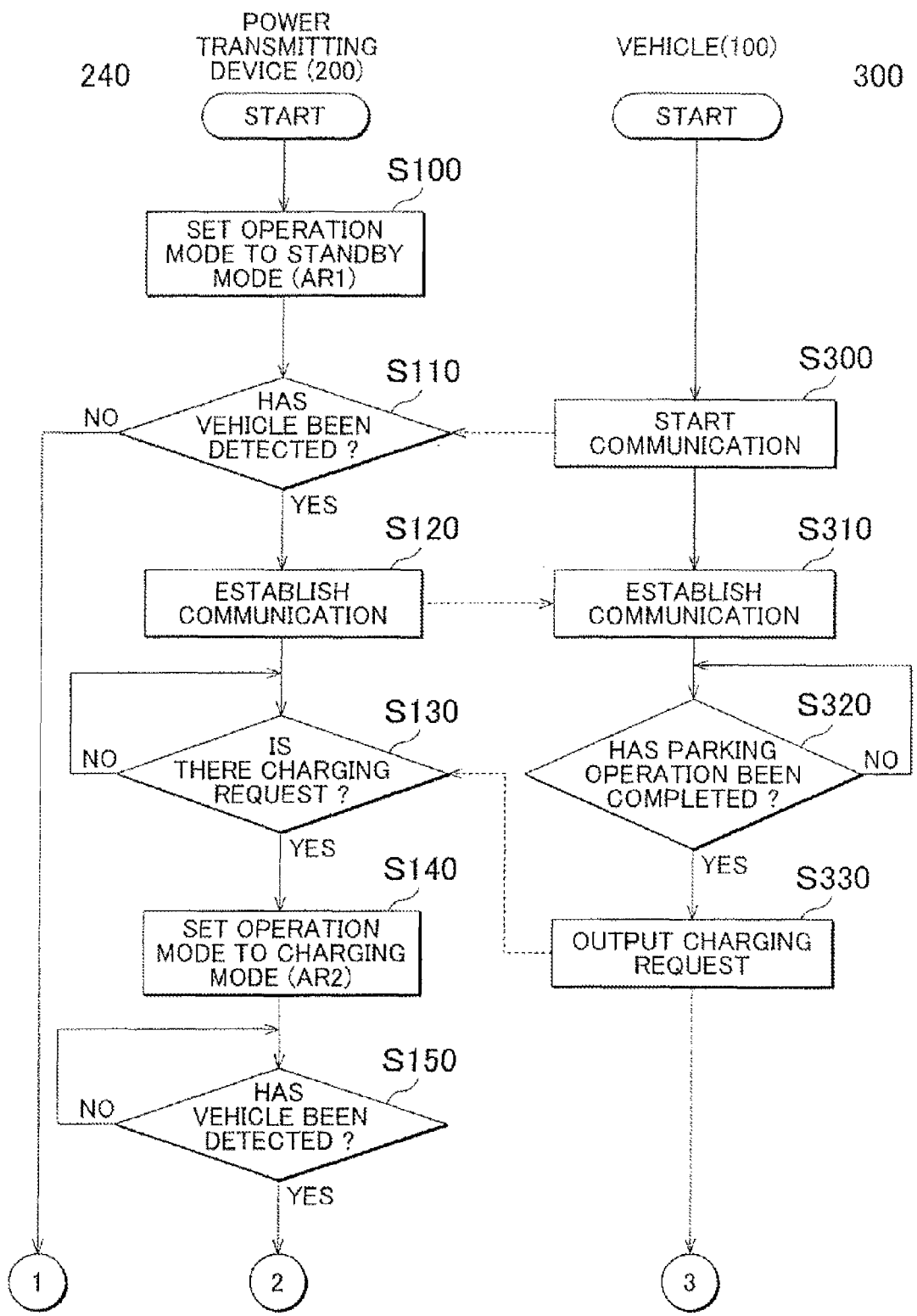
FIGS. 11A and 11B are flowcharts for illustrating the details of a process of communication range switching control according to the first embodiment.
Figure 11B:
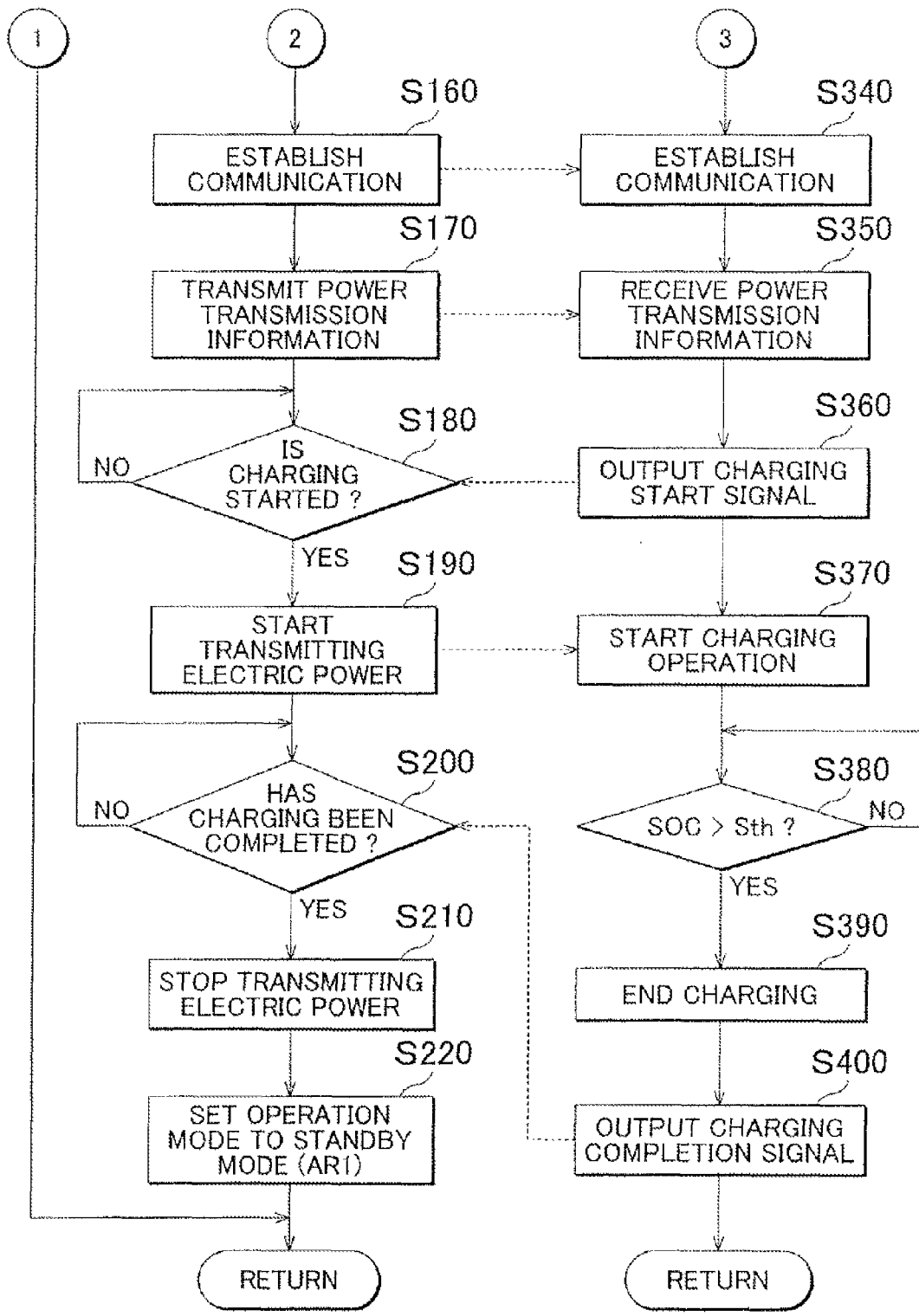

FIG. 11 is a flowchart for illustrating the details of the process of communication range switching control that is executed by the power transmitting ECU 240 of the power transmitting device 200 according to the first embodiment. In FIG. 11, a process in the corresponding vehicle 100 is also shown together.

Figure 13A:
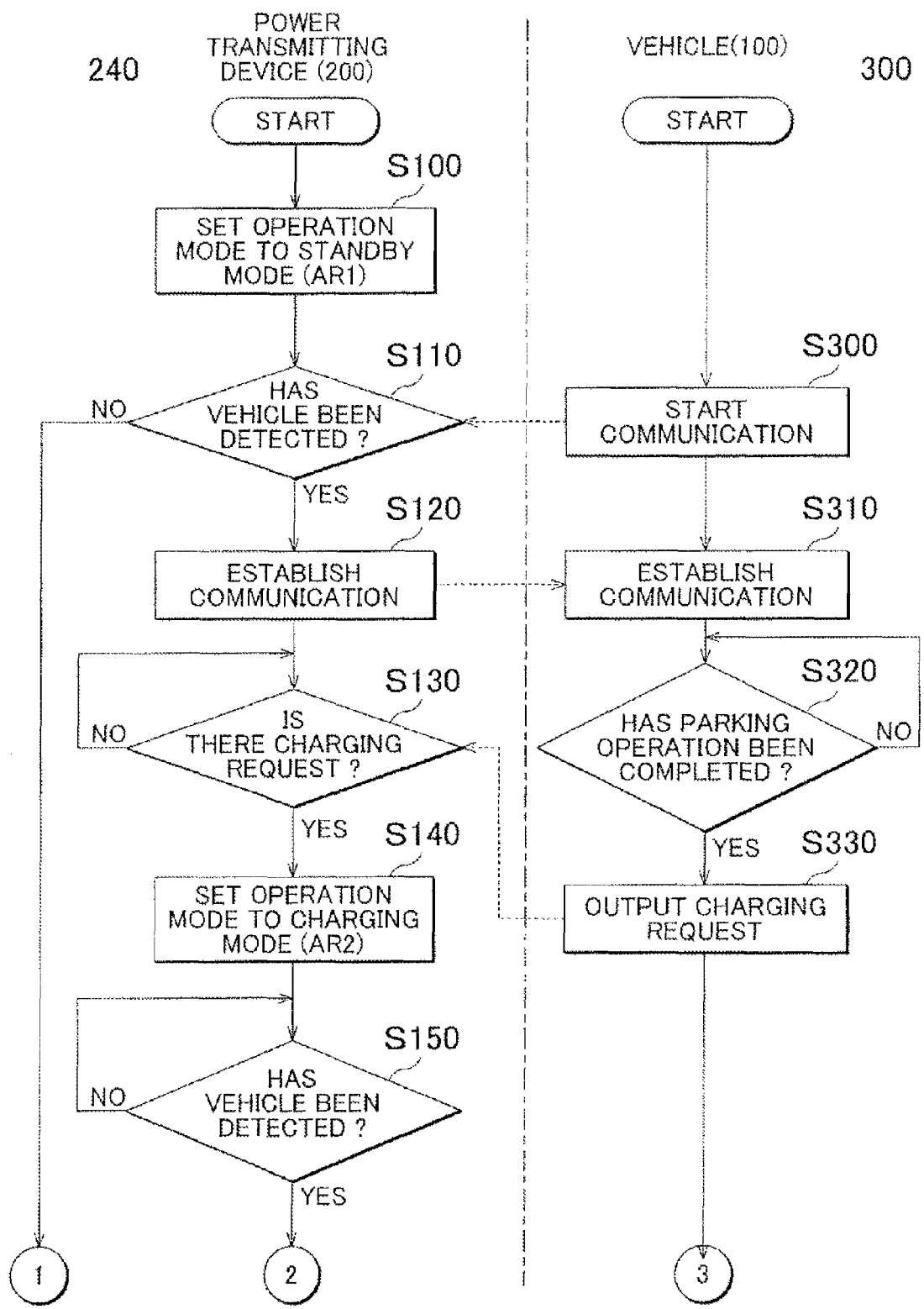
FIGS. 13A and 13B are flowcharts for illustrating the details of a process of communication range switching control according to the second embodiment.
Figure 13B:
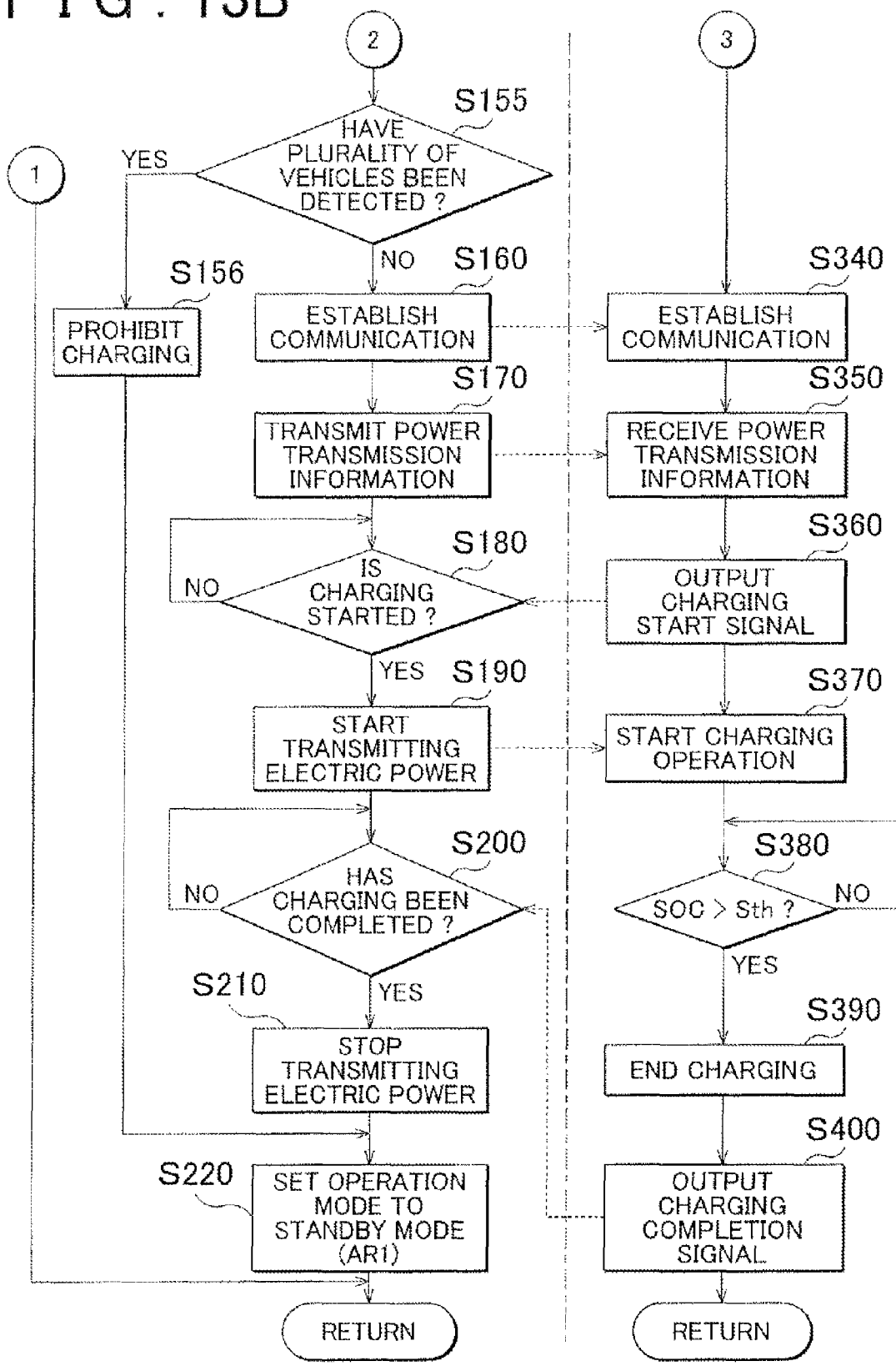
Figure 15A:
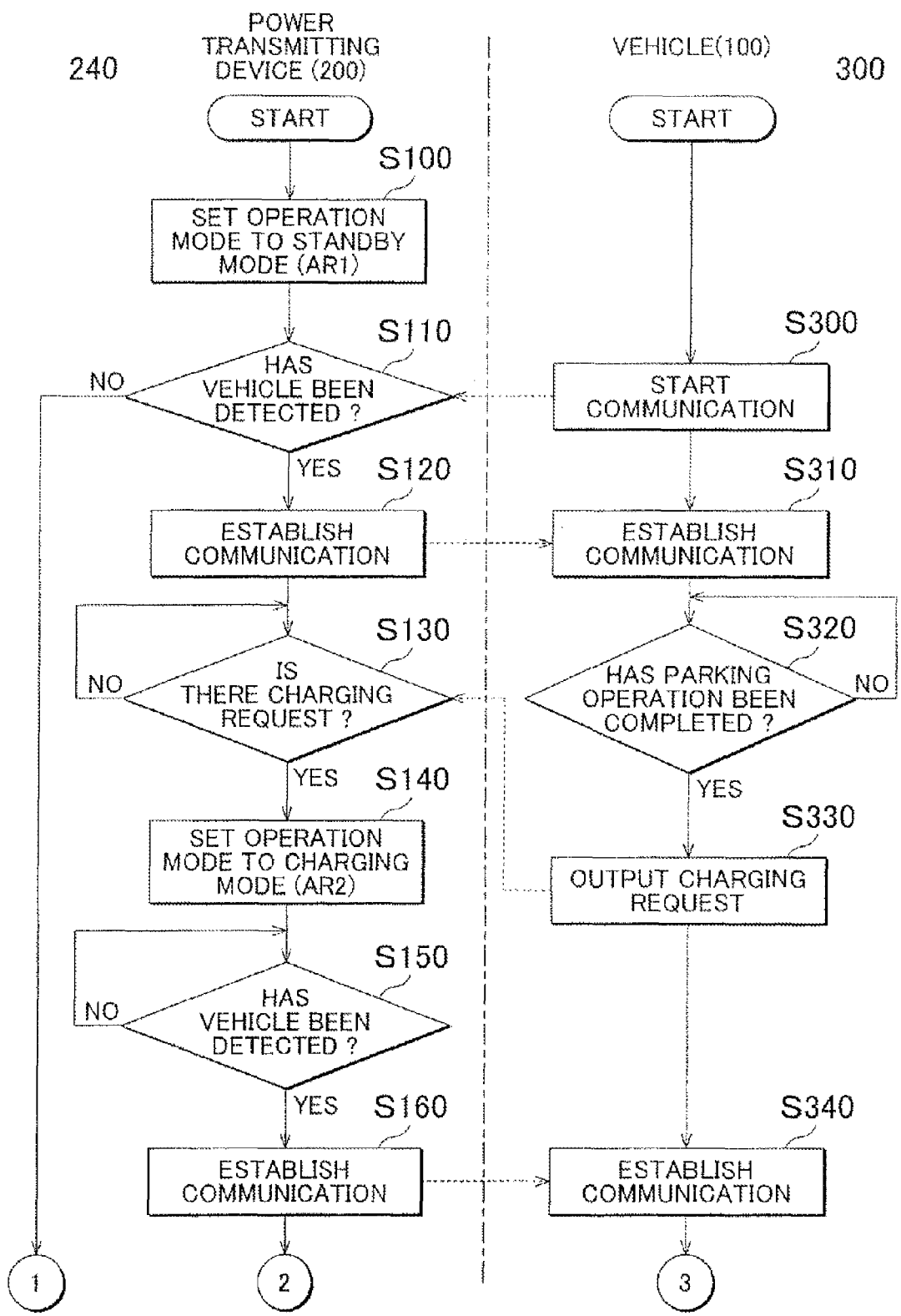
FIGS. 15A and 15B are flowcharts for illustrating the details of a process of communication range switching control according to the third embodiment.
Figure 15B:
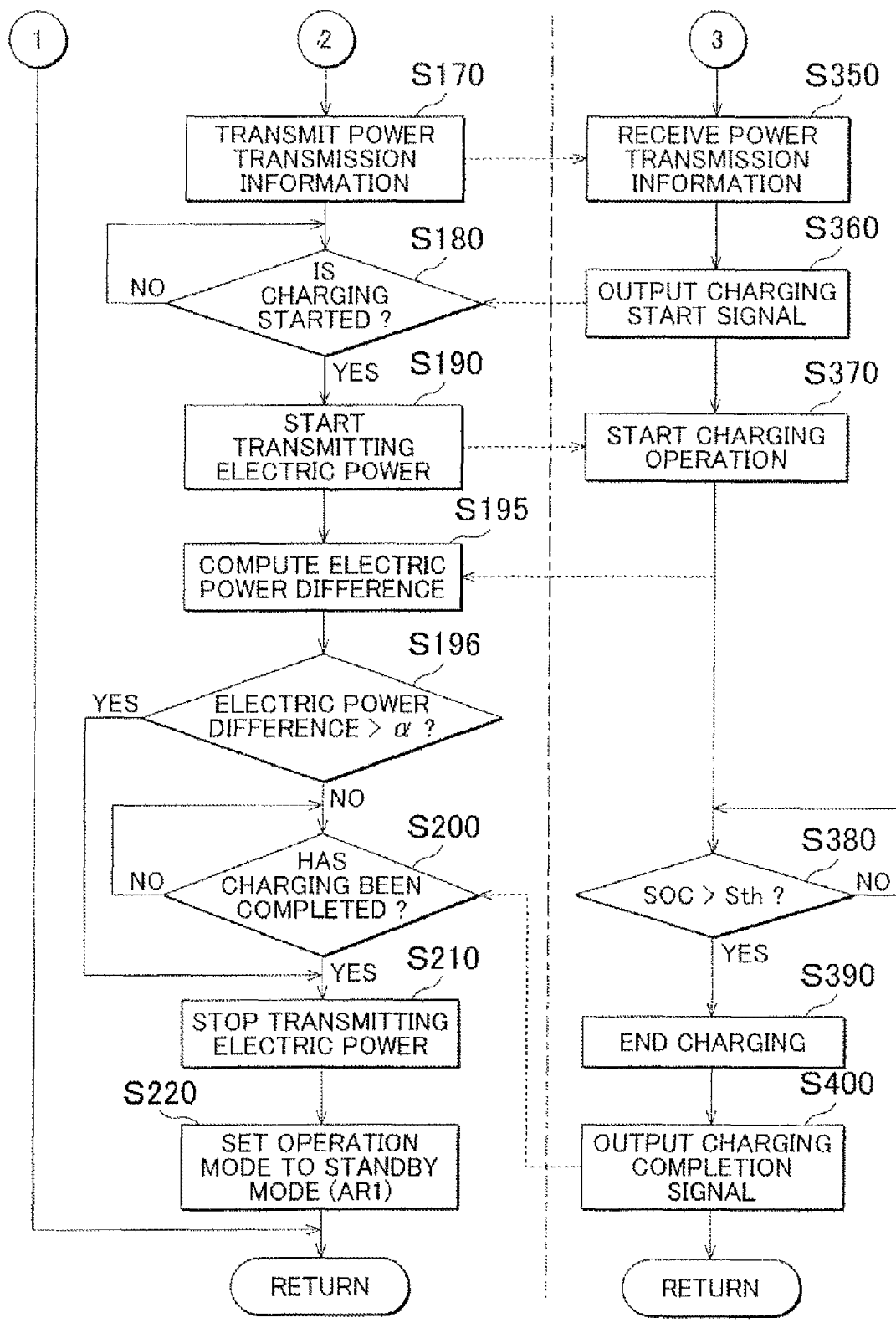
Figure 16A:
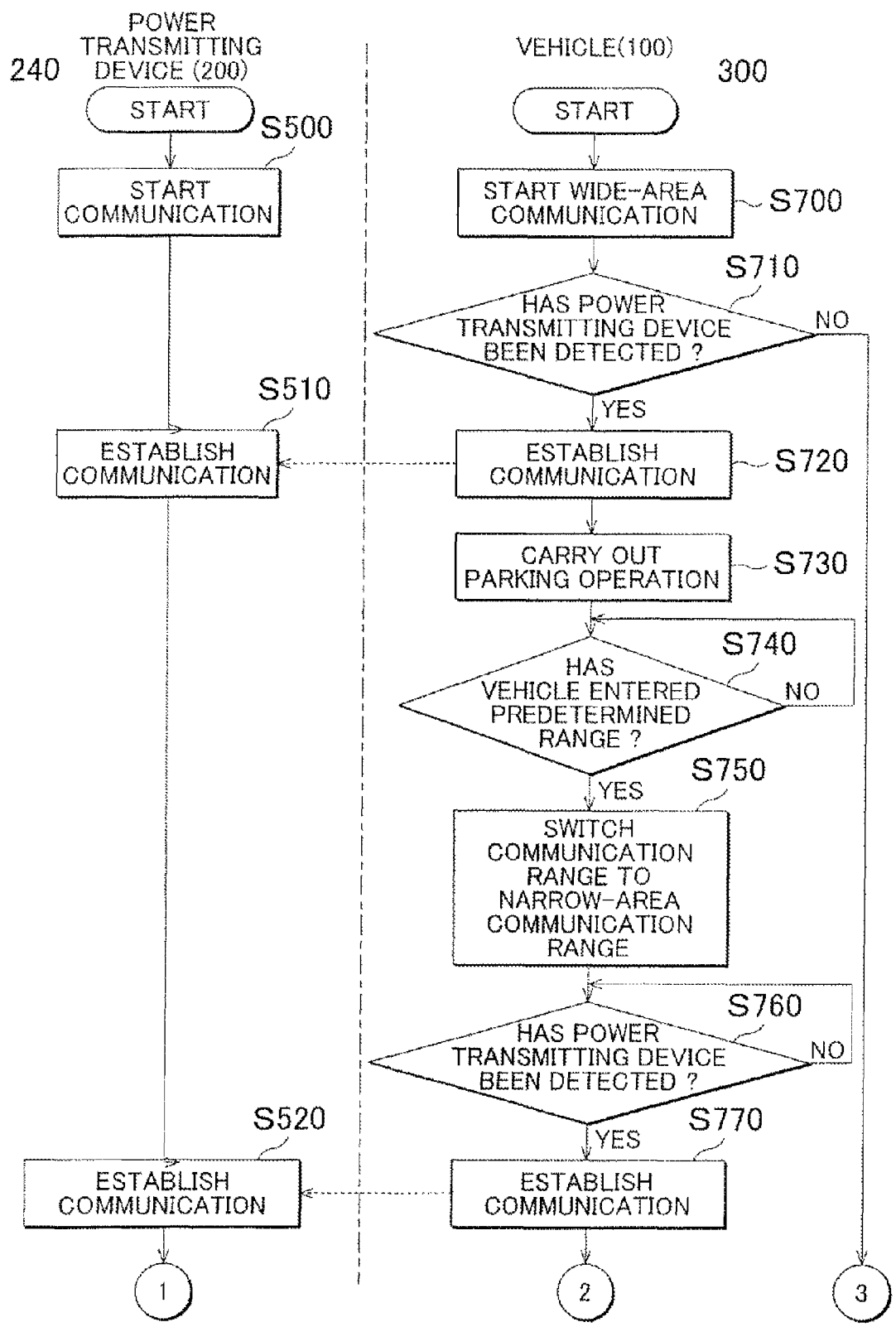
FIGS. 16A and 16B are flowcharts for illustrating the details of a process of communication range switching control according to a fourth embodiment.
Figure 16B:
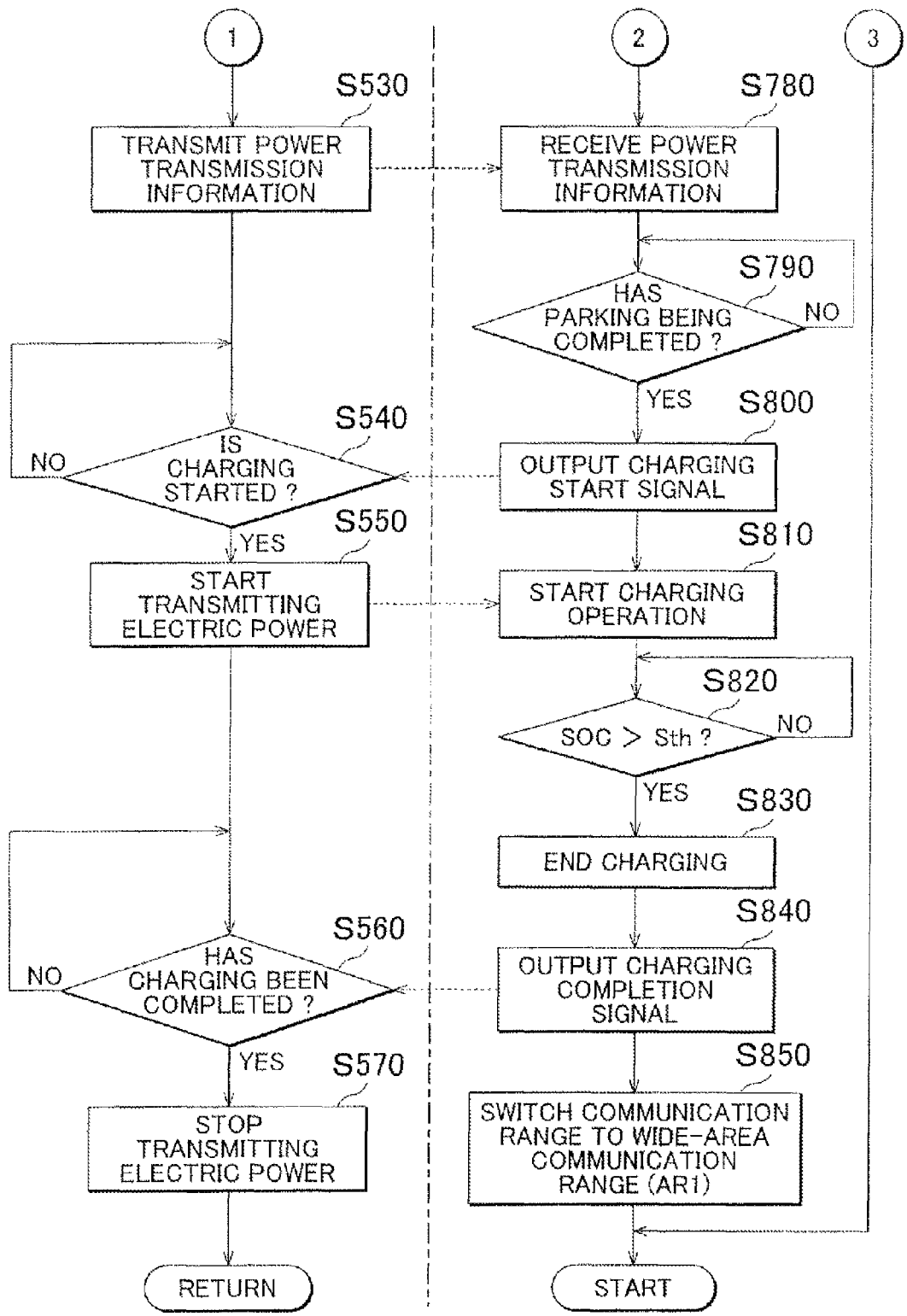

Steps in the flowchart in FIG. 11 and steps in the flowcharts described later in FIG. 13, FIG. 15 and FIG. 16 are implemented by executing programs prestored in the power transmitting ECU 240 or the vehicle ECU 300 and are called from a main routine at predetermined intervals or in response to fulfillment of a predetermined condition. Alternatively, for part of steps, the process may be implemented by constructing an exclusive hardware (electronic circuit).

In the flowchart in FIG. 11 and the flowcharts described later in FIG. 13, FIG. 15 and FIG. 16, description will be made typically on an example in which communication is carried out between the power transmitting device 200 and the vehicle 100 as shown in FIG. 2.

First, the process in the power transmitting device 200 will be described with reference to FIG. 2 and FIG. 11. In step (hereinafter, step is abbreviated as "S") 100, the power transmitting ECU 240 sets the operation mode to the standby mode, and sets the communication range to the wide-area communication range AR1. In this wide-area communication, for example, information about whether the power transmitting device 200 is usable and information about the specifications, and the like, of the power transmitting device 200 are transmitted.

In S110, the power transmitting ECU 240 searches for a vehicle within the communication range, and determines whether a vehicle has been detected. When no vehicle has been detected (NO in S110), it is not required to transmit electric power to a vehicle, so the following process is skipped, and the process is returned to the main routine.

When a vehicle has been detected (YES in S110), the process proceeds to S120, and the power transmitting ECU 240 establishes communication with the detected vehicle 100. Then, in S130, the power transmitting ECU 240 determines whether a charging request signal has been received from the vehicle 100.

When no charging request signal has been received from the vehicle 100 (NO in S130), the process returns to S130, and the power transmitting ECU 240 waits for a charging request signal from the vehicle 100.

When the charging request signal has been received from the vehicle 100 (YES in S130), the process proceeds to S140, and the power transmitting ECU 240 switches the operation mode from the standby mode to the charging mode, and switches the communication range to the narrow-area communication range AR2. In this narrow-area communication, for example, information about a charging efficiency and an SOC during charging operation, charging fee (billing) information, and the like, are transmitted between the vehicle 100 and the power transmitting device 200.

Note that, other than the above charging request signal, the timing at which communication is switched from wide-area communication to narrow-area communication may be, for example, the timing at which, when a sensor for detecting whether there is a vehicle in the corresponding parking space is provided at the power transmitting device 200, communication is switched in response to detection of a vehicle by the sensor or the timing at which communication is switched in response to reception of a pairing request signal.

In S150, the power transmitting ECU 240 searches for the vehicle 100 again within the narrowed communication range AR2. Note that, as described with reference to FIG. 8, the communication range AR2 is, for example, a range that just covers the parking space in which the power transmitting device 200 is provided, and the fact that a vehicle has been detected within the communication range AR2 means that a vehicle is present in the parking space.

When the vehicle 100 has been detected within the communication range AR2 (YES in S150), the power transmitting ECU 240 establishes communication with the vehicle 100 (S160), and transmits power transmission information that includes an electric power transmitted from the power transmitting device 200, a power transmission efficiency of the power transmitting device 200, and the like, to the vehicle 100.

After that, when the power transmitting ECU 240 receives a charging start signal from the vehicle 100 (YES in S180), the power transmitting ECU 240 starts transmitting electric power to the vehicle 100 in S190. Then, in S200, the power transmitting ECU 240 determines whether charging has been completed on the basis of a signal from the vehicle 100.

When charging has not been completed (NO in S200), the process is returned to S200, and the power transmitting ECU 240 waits for completion of charging. When charging has been completed (YES in S200), the power transmitting ECU 240 stops transmitting electric power to the vehicle 100 (S210), switches the operation mode to the standby mode, and switches the communication range to the wide-area communication range.

Although not shown in FIG. 11, in S130, S150 or S180, when a predetermined signal has not been received from the vehicle 100 for a long period of time, the power transmitting ECU 240 may end the process of that step. This also applies to the following flowcharts.

Next, the process in the vehicle 100 will be described. In S300, the vehicle ECU 300, for example, starts communication through user's operation. When the vehicle 100 has been detected by the power transmitting device 200, the vehicle ECU 300 establishes communication with the power transmitting device 200 on the basis of the signal from the power transmitting device 200 in S310. At this time, for example, information about the location of the parking space in which the power transmitting device 200 is provided in a parking lot and information about the specifications, and the like, of the power transmitting device 200 are transmitted from the power transmitting device 200.

When operation for parking the vehicle 100 to the parking space in which the power transmitting device 200 is provided has been completed through user's operation (YES in S320) and then instructions to start charging are issued, the vehicle ECU 300 outputs the charging request signal to the power transmitting device 200 (S330).

After that, when the communication range is switched to the narrow-area communication range in the power transmitting device 200, the vehicle ECU 300 establishes communication with the power transmitting device 200 again in S340. In S350, the vehicle ECU 300 receives power transmission information from the power transmitting device 200, and prepares for receiving electric power on the basis of the received information.

When preparations for receiving electric power have been completed, the vehicle ECU 300 outputs a charging start signal to the power transmitting device 200 in S360. In response to this, electric power starts to be transmitted from the power transmitting device 200, and the vehicle ECU 300 charges the electrical storage device 190 using electric power from the power transmitting device 200 in S370.

In S380, the vehicle ECU 300 determines whether the SOC of the electrical storage device 190 has exceeded a predetermined threshold Sth, that is, whether the electrical storage device 190 has been fully charged. When the electrical storage device 190 has not been fully charged (NO in S380), the process is returned to S380, and the vehicle ECU 300 continues charging the electrical storage device 190 until the electrical storage device 190 becomes a fully charged state.

When the electrical storage device 190 has been fully charged (YES in S380), the vehicle ECU 300 stops charging operation (S390), and outputs a charging completion signal to the power transmitting device 200 (S400).

The above description is made on the example in which it is only determined in S380 whether the electrical storage device 190 becomes a fully charged state. For example, when charging operation is forcibly interrupted by the user before the electrical storage device 190 is fully charged as well, a charging completion signal is output from the vehicle ECU 300 to the power transmitting device 200.

For the sake of easy understanding, the above description is made on a state where the power transmitting device and the vehicle communicate in a one-to-one correspondence with each other. It is noted that the power transmitting device can communicate with a plurality of vehicles at the same time and, on the other hand, the vehicle can also communicate with a plurality of power transmitting devices at the same time.

By executing control in accordance with the above-described processes, in the contactless power supply system that is able to transmit information through wireless communication between the power transmitting device and the vehicle, it is possible to correctly perform pairing between the power transmitting device and the vehicle by appropriately switching the communication range between the wide-area communication range and the narrow-area communication range. By so doing, it is possible to appropriately supply electric power to the vehicle to which electric power should be transmitted.

Next, a second embodiment will be described. In the first embodiment, the description is made on the case where, when the communication range is switched to the narrow-area communication range, the power transmitting device is able to communicate with only one vehicle present in the corresponding parking space. However, for example, when the vehicle is not appropriately parked in a predetermined parking space and the power transmitting device still communicates with a plurality of vehicles even when the communication range is switched to the narrow-area communication range, the power transmitting device can be placed in a state where it is not possible to appropriately identify the vehicle to which electric power should be transmitted.

In this case, electric power may not be appropriately supplied to the vehicle or a remarkable decrease in efficiency may occur.

In the second embodiment, a configuration in which, when a plurality of vehicles have been detected even after the communication range is switched to the narrow-area communication range, transmission of electric power from the power transmitting device is prohibited will be described.

Figure 12:
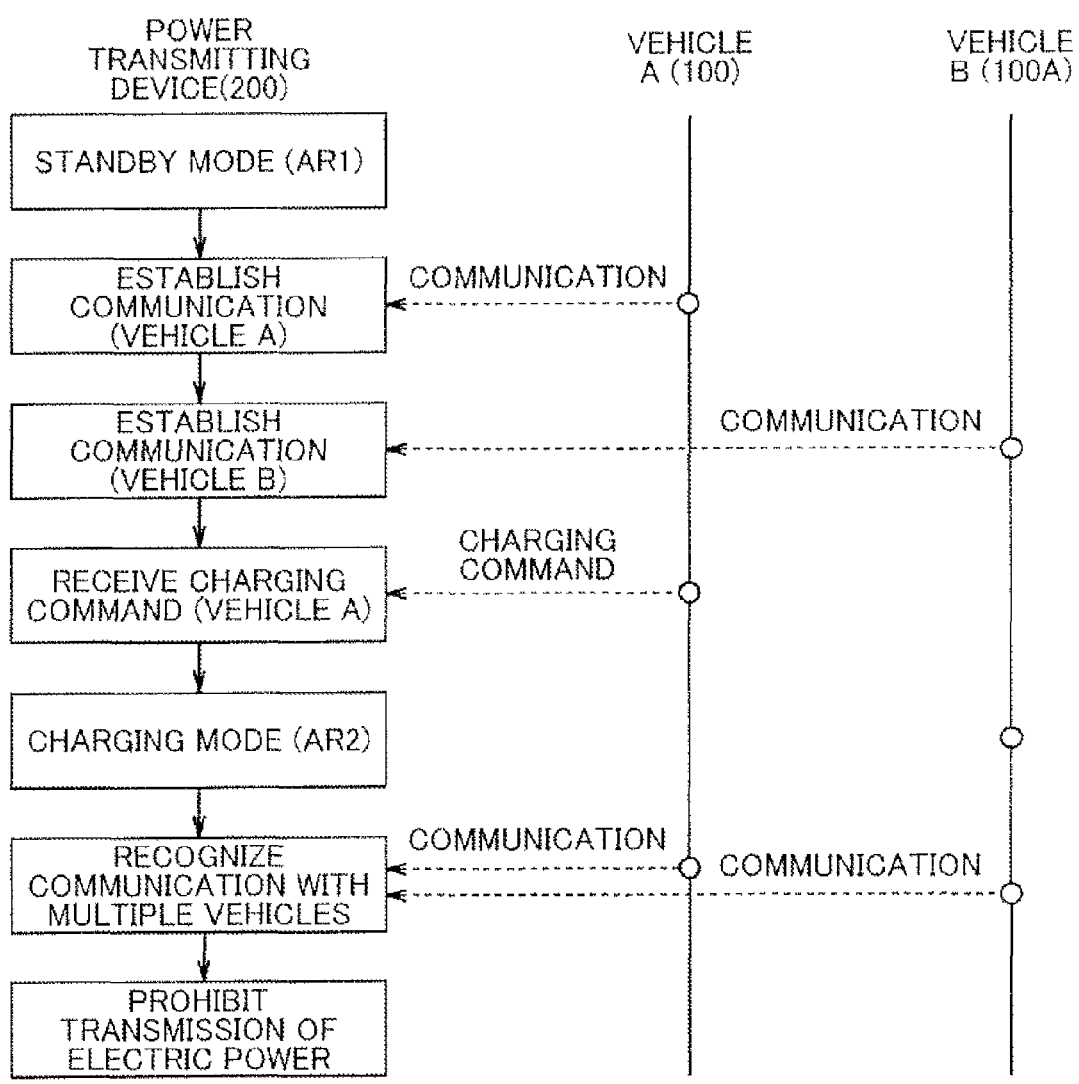
FIG. 12 is a view for illustrating a schematic communication sequence according to a second embodiment.

FIG. 12 is a view for illustrating a schematic communication sequence according to the second embodiment. As shown in FIG. 12, the power transmitting device 200, as in the case of FIG. 10 in the first embodiment, establishes communication with the vehicle A and the vehicle B in the standby mode in which wide-area communication is carried out, and, upon reception of a charging command from the vehicle A, switches the operation mode to the charging mode and switches the communication range to the narrow-area communication range.

Incidentally, for example, because of an inappropriate parking position of the vehicle, even after the communication range has been switched to the narrow-area communication range, the power transmitting device 200 communicates with both the vehicle A and the vehicle B. In such a case, the vehicle to which electric power should be transmitted cannot be identified, so transmission of electric power from the power transmitting device 200 is prohibited.

FIG. 13 is a flowchart for illustrating the details of the process of communication range switching control that is executed by the power transmitting ECU 240 of the power transmitting device 200 according to the second embodiment. In FIG. 13 as well, a process in the corresponding vehicle is also shown together.

The flowchart for the power transmitting device 200, shown in FIG. 13, is obtained by adding step S155 and step S156 to the flowchart for the power transmitting device 200, shown in FIG. 11. The flowchart for the vehicle 100, shown in FIG. 13, is similar to that of FIG. 11. The description of steps in FIG. 13, which overlap with the steps in FIG. 11, is not repeated.

As shown in FIG. 13, after the power transmitting ECU 240 switches the operation mode to the charging mode to switch the communication range to the narrow-area communication range (S140), when the power transmitting ECU 240 has detected a vehicle within the communication range (YES in S150), the process proceeds to S155, and the power transmitting ECU 240 subsequently determines whether a plurality of vehicles have been detected.

When a plurality of vehicles have not been detected and only one vehicle has been detected (NO in S155), the power transmitting ECU 240 executes the processes of S160 to S220 as in the case of the first embodiment.

On the other hand, when a plurality of vehicles have been detected (YES in S155), the process proceeds to S155, and the power transmitting ECU 240 prohibits charging of the plurality of detected vehicles. Then, the process proceeds to S220, and the power transmitting ECU 240 switches the operation mode to the standby mode, and carries out wide-area communication.

By executing control in accordance with the above-described process, in the contactless power supply system that is able to transmit information through wireless communication between the power transmitting device and the vehicle, it is possible to correctly perform pairing between the power transmitting device and the vehicle, and it is possible to reliably stop charging operation when a plurality of vehicles have been detected through narrow-area communication.

Next, a third embodiment will be described. Even when switching of the communication range, described in the first embodiment, is performed, the power transmitting device may communicate with a vehicle of the adjacent parking space depending on a surrounding communication environment, such as a radio wave condition, or a state of the sensitivity of the communication unit.

Then, in the third embodiment, a configuration in which it is determined whether pairing between a power transmitting device and a vehicle is appropriate on the basis of a power transfer efficiency in the case where electric power is being supplied from the power transmitting device to the vehicle will be described.

Figure 14:
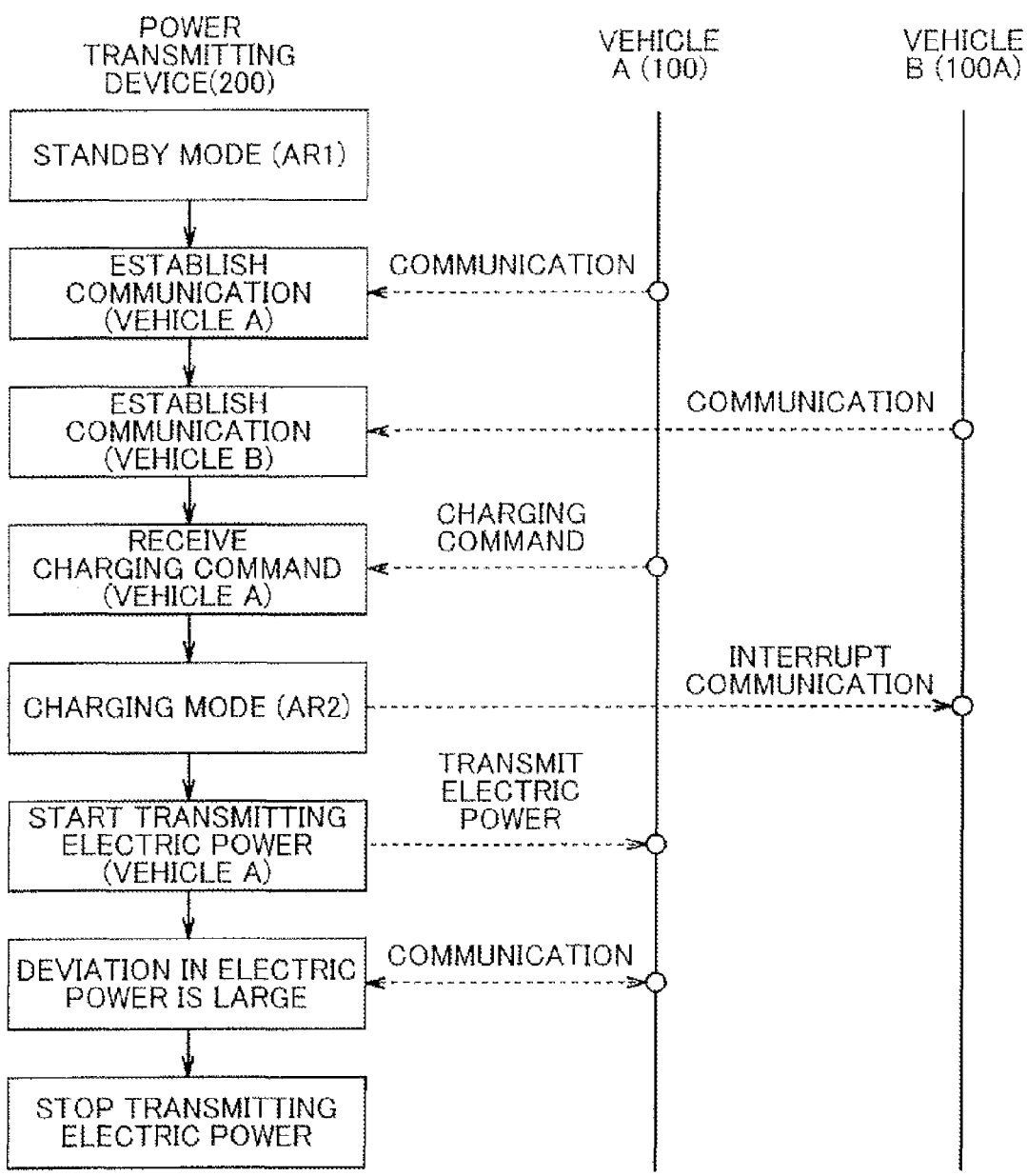
FIG. 14 is a view for illustrating a schematic communication sequence according to a third embodiment.

FIG. 14 is a view for illustrating a schematic communication sequence according to the third embodiment. As shown in FIG. 14, the power transmitting device 200, as in the case of FIG. 10 in the first embodiment, establishes communication with the vehicle A and the vehicle B in the standby mode in which wide-area communication is carried out, and, when a charging command is received from the vehicle A, switches the operation mode to the charging mode and switches the communication range to the narrow-area communication range.

Thus, communication with the vehicle B is interrupted, and the power transmitting device 200 communicates with only the vehicle A. Then, electric power starts to be transmitted from the power transmitting device 200 to the vehicle A.

While the power transmitting device 200 is transmitting electric power, the power transmitting device 200 receives information about an electric power received by the vehicle A through narrow-area communication, and compares an electric power transmitted from the power transmitting device 200 with the electric power received by the vehicle. When there is a large deviation between the transmitted electric power and the received electric power, the power transmitting device 200 determines that the vehicle A is not parked at an appropriate position of the parking space in which the power transmitting device 200 is provided, and stops transmitting electric power to the vehicle A.

The deviation between a transmitted electric power and a received electric power may be evaluated on the basis of a difference between the transmitted electric power and the received electric power or may be evaluated on the basis of the ratio of the received electric power to the transmitted electric power. Not only when a received electric power is smaller than a transmitted electric power but also when a received electric power is larger than a transmitted electric power, a vehicle to which electric power is actually transmitted may be erroneously recognized as a vehicle to which electric power should be transmitted, so it is desirable to stop transmitting electric power.

FIG. 15 is a flowchart for illustrating the details of the process of communication range switching control that is executed by the power transmitting ECU 240 of the power transmitting device 200 according to the third embodiment. In FIG. 15 as well, a process in the corresponding vehicle is also shown together.

The flowchart for the power transmitting device 200, shown in FIG. 15, is obtained by adding step S195 and step S196 to the flowchart for the power transmitting device 200, shown in FIG. 11 of the first embodiment. The flowchart for the vehicle 100, shown in FIG. 15, is similar to that of FIG.

11. The description of steps in FIG. 15, which overlap with the steps in FIG. 11, is not repeated.

As shown in FIG. 15, when the power transmitting ECU 240 switches the communication range to the narrow-area communication range (S170) and then starts transmitting electric power to the vehicle 100 (S190), the power transmitting ECU 240 receives information about a received electric power, which is transmitted from the vehicle 100 through narrow-area communication, and computes an electric power difference between the transmitted electric power and the received electric power in S195.

In S196, the power transmitting ECU 240 determines whether the computed electric power difference is larger than a predetermined threshold α.

When the electric power difference is smaller than or equal to the threshold α (NO in S196), the power transmitting ECU 240 determines that the vehicle 100 is appropriately parked in the parking space in which the power transmitting device 200 is provided and is appropriately being charged. That is, the power transmitting ECU 240 determines that the vehicle 100 is the vehicle to which electric power should be transmitted. Therefore, the power transmitting ECU 240 proceeds with the process to S200, and continues power transmitting operation until charging is completed as in the case of the first embodiment.

On the other hand, when the electric power difference is larger than the threshold α (YES in S196), the power transmitting ECU 240 determines that the vehicle 100 is not appropriately parked in the parking space and is not the vehicle to which electric power should be transmitted. Therefore, the power transmitting ECU 240 proceeds with the process to S210, and stops transmitting electric power to the vehicle 100.

By executing control in accordance with the above-described process, in the contactless power supply system that is able to transmit information through wireless communication between the power transmitting device and the vehicle, it is possible to determine whether pairing between the power transmitting device and the vehicle is erroneously performed.

Note that the process of the third embodiment may also be applied to the second embodiment. In the above-described first to third embodiments, the description is made on the case where the communication range of the power transmitting device is switched.

Next, a fourth embodiment will be described. In the fourth embodiment, a configuration in which a vehicle identifies a power transmitting device by switching the communication range between a narrow-area communication range and a wide-area communication range will be described. Note that, when the vehicle carries out wide-area communication as in the case of the fourth embodiment, the communication range of the communication unit in the power transmitting device is set to the narrow-area communication range.

FIG. 16 is a flowchart for illustrating the details of the process of communication range switching control according to the fourth embodiment. First, the process that is executed by the vehicle ECU 300 of the vehicle 100 will be described. As shown in FIG. 2 and FIG. 16, in S700, the vehicle ECU 300, for example, starts wide-area communication through user's operation, and searches for a power transmitting device within the communication range. In S710, the vehicle ECU 300 determines whether a power transmitting device has been detected.

When no power transmitting device has been detected (NO in S710), there is no usable power transmitting device within the communication range, so the vehicle ECU 300 skips the subsequent process and returns the process to the main routine.

When the power transmitting device 200 has been detected (YES in S710), the process proceeds to S720, and the vehicle ECU 300 establishes communication with the power transmitting device 200. In S730, operation for parking the vehicle 100 to the parking space is carried out through user's operation. At this time, the vehicle ECU 300 may assist user's parking operation through, for example, a camera image.

The vehicle ECU 300 determines whether the vehicle 100 has entered a predetermined range of the parking space. This determination may be made on the basis of, for example, GPS information of a navigation system. Alternatively, when vehicle position adjustment control is executed using a micro electric power from the power transmitting device 200, the above determination may be made on the basis of the fact that the electric power from the power transmitting device 200 has been detected.

When the vehicle 100 has not entered the predetermined range yet (NO in S740), the process returns to S740, and the vehicle ECU 300 waits until the vehicle 100 enters the predetermined range.

When the vehicle 100 has entered the predetermined range (YES in S740), the process proceeds to S750, and the vehicle ECU 300 switches the communication range to the narrow-area communication range. In S760, the vehicle ECU 300 searches for the power transmitting device 200 within the switched communication range.

When the power transmitting device 200 has been detected through narrow-area communication (YES in S760), the vehicle ECU 300 establishes communication with the power transmitting device 200 again in S770.

In S780, the vehicle ECU 300 receives power transmission information that is transmitted from the power transmitting device 200 in response to the fact that narrow-area communication has been established. The vehicle ECU 300 prepares for charging operation on the basis of the received information.

After that, in S790, the vehicle ECU 300 determines whether parking of the vehicle 100 has been completed. When the parking has been completed (YES in S790), the vehicle ECU 300 proceeds with the process to S800.

In S800, the vehicle ECU 300 outputs a charging start signal to the power transmitting device 200 on the basis of, for example, user's operation. When electric power starts to be transmitted from the power transmitting device 200, the vehicle ECU 300 starts charging operation in S810.

In S820, the vehicle ECU 300 determines whether the SOC of the electrical storage device 190 has exceeded the threshold Sth that indicates a fully charged state. When the SOC is lower than or equal to the threshold Sth (NO in S820), the process returns to S820, and the vehicle ECU 300 continues charging operation.

When the SOC has exceeded the threshold Sth (YES in S820), the process proceeds to S830, and the vehicle ECU 300 ends the charging operation, and outputs a charge completion signal to the power transmitting device 200 (S840). After that, in S850, the vehicle ECU 300 switches the communication range to the wide-area communication range.

Next, the process that is executed by the power transmitting ECU 240 of the power transmitting device 200 will be described. The power transmitting ECU 240 starts communication in S500. In S510, the power transmitting ECU 240 establishes communication with the vehicle 100 on the basis of a signal from the vehicle 100.

After that, when the communication range of the vehicle 100 is switched to the narrow-area communication range and then the power transmitting device 200 has been detected by the vehicle 100, the power transmitting ECU 240 establishes communication with the vehicle 100 again on the basis of a signal from the vehicle 100. In S530, the power transmitting ECU 240 outputs power transmission information to the vehicle 100.

When charging preparations based on the power transmission information from the power transmitting device 200 have been completed in the vehicle 100 and then the power transmitting ECU 240 receives the charging start signal from the vehicle 100 (YES in S540), the power transmitting ECU 240 starts transmitting electric power to the vehicle 100 in S550.

When the power transmitting ECU 240 receives the charging completion signal from the vehicle 100 in S560 (YES in S560), the power transmitting ECU 240 stops transmitting electric power to the vehicle 100 (S570).

By executing control in accordance with the above-described processes, it is possible to correctly perform pairing between the power transmitting device and the vehicle by switching the communication range at the vehicle.

Note that the processes similar to those of the second and third embodiments may be further applied to the fourth embodiment.

By appropriately combining the first embodiment with the fourth embodiment, the communication range may be configured to be switched at both the vehicle and the power transmitting device.

Furthermore, the description is made on the example in which the above-described contactless power supply system is configured such that the power receiving device is the vehicle; however, a power supply target is not limited to the vehicle. The contactless power supply system may be applied to any electrical system that includes a chargeable electrical storage device.

While the invention has been described with reference to example embodiments thereof, it is to be understood that the invention is not limited to the example described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

What is claimed is:

1. A vehicle that contactlessly receives electric power from a power transmitting device, comprising:
    a power receiving unit configured to contactlessly receive electric power from the power transmitting device;
    an electric load configured to operate by utilizing electric power received by the power receiving unit;
    a communication unit configured to carry out wireless communication with the power transmitting device, the communication unit being configured to switch a spatially communicable communication range between a first range and a second range narrower than the first range; and
    a control unit configured to, at the time of identifying the power transmitting device from which electric power should be received, control the communication unit such that the communication unit communicates with the power transmitting device using the second range, wherein
    the control unit is configured to switch the communication range from the first range to the second range on the basis of information indicating that a distance to the power transmitting device has become a predetermined distance, and
    the control unit is configured to, after identifying the power transmitting device, switch the communication range from the second range to the first range.

2. The vehicle according to claim 1, wherein the control unit is configured to, when communication is carried out using the first range, communicate with the power transmitting device about at least information about whether the power transmitting device is allowed to supply electric power.

3. The vehicle according to claim 1, wherein the electric load includes an electrical storage device configured to store electric power received by the power receiving unit, and the control unit is configured to, when communication is carried out using the second range, communicate with the power transmitting device on at least one of information about a charging efficiency, information about an amount of charge of the electrical storage device and information about a fee for charging.

4. The vehicle according to claim 1, wherein the control unit is configured to, when a plurality of the power transmitting devices are recognized while communication is being carried out using the second range, stop transmission of electric power from the power transmitting devices.

5. The vehicle according to claim 1, wherein the communication unit is configured to switch the communication range by varying a power of a signal used for communication.

6. The vehicle according to claim 1, wherein the control unit is configured to stop transmission of electric power from the power transmitting device, when a transfer efficiency of electric power does not satisfy a predetermined condition, the transfer efficiency of electric power being received by the power receiving unit with respect to electric power transmitted from the power transmitting device.

7. The vehicle according to claim 1, wherein the power transmitting device includes a power transmitting unit configured to contactlessly transmit electric power to the power receiving unit, and a difference between a natural frequency of the power transmitting unit and a natural frequency of the power receiving unit is smaller than or equal to ±10% of one of the natural frequency of the power transmitting unit and the natural frequency of the power receiving unit.

8. The vehicle according to claim 1, wherein the power transmitting device includes a power transmitting unit configured to contactlessly transmit electric power to the power receiving unit, and a coupling coefficient between the power transmitting unit and the power receiving unit is smaller than or equal to 0.1.

9. The vehicle according to claim 1, wherein the power transmitting device includes a power transmitting unit configured to contactlessly transmit electric power to the power receiving unit, and the power receiving unit is configured to receive electric power from the power transmitting unit through at least one of a magnetic field and an electric field, the magnetic field being formed between the power receiving unit and the power transmitting unit, the magnetic field oscillating at a predetermined frequency, the electric field being formed between the power receiving unit and the power transmitting unit, and the electric field oscillating at a predetermined frequency.

10. A power receiving device that contactlessly receives electric power from a power transmitting device, comprising:
a power receiving unit configured to contactlessly receive electric power from the power transmitting device;
a communication unit configured to carry out wireless communication with the power transmitting device, the communication unit being configured to switch a spatially communicable communication range between a first range and a second range narrower than the first range; and
a control unit configured to, at the time of identifying the power transmitting device from which electric power should be received, control the communication unit such that the communication unit communicates with the power transmitting device using the second range, wherein
the control unit is configured to switch the communication range from the first range to the second range on the basis of information indicating that a distance to the power transmitting device has become a predetermined distance, and
the control unit is configured to, after identifying the power transmitting device, switch the communication range from the second range to the first range.

11. A power transmitting device that contactlessly supplies electric power to a power receiving device, comprising:
a power transmitting unit configured to contactlessly transmit electric power to the power receiving device;
a communication unit configured to carry out wireless communication with the power receiving device, the communication unit being configured to switch a spatially communicable communication range between a first range and a second range narrower than the first range; and
a control unit configured to, at the time of identifying the power receiving device to which electric power should be transmitted, control the communication unit such that the communication unit communicates with the power receiving device using the second range, wherein
electric power received by the power receiving device using the second range is charged to an electrical storage device, and
the control unit is configured to, after charging of the electrical storage device has been completed, switch the communication range from the second range to the first range for non-charging communication,
the control unit is configured to switch the communication range from the first range to the second range on the basis of information indicating that a distance to the power receiving device has become a predetermined distance, and
the control unit is configured to, after identifying the power receiving device, switch the communication range from the second range to the first range.

12. The power transmitting device according to claim 11, wherein
the control unit is configured to, when communication is carried out using the first range, communicate with the power receiving device on at least information about whether the power transmitting device is allowed to supply electric power.

13. The power transmitting device according to claim 11, wherein
electric power received by the power receiving device is charged to an electrical storage device, and
the control unit is configured to, when communication is carried out using the second range, communicate with the power receiving device on at least one of information about a charging efficiency, information about an amount of charge of the electrical storage device and information about a fee for charging.

14. The power transmitting device according to claim 11, wherein
the control unit is configured to, when a plurality of the power receiving devices are recognized while communication is being carried out using the second range, stop transmission of electric power to the power receiving devices.

15. The power transmitting device according to claim 11, wherein
the communication unit is configured to switch the communication range by varying a power of a signal used for communication.

16. The power transmitting device according to claim 11, wherein
the control unit is configured to stop transmission of electric power to the power receiving device, when a transfer efficiency of electric power does not satisfy a predetermined condition, the transfer efficiency of electric power being received by the power receiving device with respect to electric power transmitted from the power transmitting unit.

17. The power transmitting device according to claim 11, wherein
the power receiving device includes a power receiving unit configured to contactlessly receive electric power from the power transmitting unit, and
a difference between a natural frequency of the power transmitting unit and a natural frequency of the power receiving unit is smaller than or equal to ±10% of one of the natural frequency of the power transmitting unit and the natural frequency of the power receiving unit.

18. The power transmitting device according to claim 11, wherein
the power receiving device includes a power receiving unit configured to contactlessly receive electric power from the power transmitting unit, and
a coupling coefficient between the power transmitting unit and the power receiving unit is smaller than or equal to 0.1.

19. The power transmitting device according to claim 11, wherein
the power receiving device includes a power receiving unit configured to contactlessly receive electric power from the power transmitting unit, and
the power receiving unit is configured to receive electric power from the power transmitting unit through at least one of a magnetic field and an electric frequency, the magnetic field being formed between the power receiving unit and the power transmitting unit, the magnetic field oscillating at a predetermined frequency, the electric field being formed between the power receiving unit and the power transmitting unit, and the electric field oscillating at a predetermined frequency.

20. A contactless power supply system, comprising:
a power transmitting device including a power transmitting unit;
a vehicle including a power receiving unit;
a communication unit configured to carry out wireless communication between the power transmitting device and the vehicle, the communication unit switching a spatially communicable communication range between a first range and a second range narrower than the first range; and
a control unit configured to, at the time of identifying a combination of the power transmitting device and the vehicle, control the communication unit such that the communication unit carries out communication using the second range, wherein electric power is contactlessly transferred from the power transmitting device to the vehicle, wherein
the control unit is configured to switch the communication range from the first range to the second range on the basis of information indicating that a distance to the power transmitting device has become a predetermined distance, and
the control unit is configured to, after identifying the power transmitting device, switch the communication range from the second range to the first range.

21. A vehicle that contactlessly receives electric power from a first power transmitting device, comprising:
a power receiving unit configured to contactlessly receive electric power from the first power transmitting device;
an electric load configured to operate by utilizing electric power received by the power receiving unit;
a communication unit configured to carry out wireless communication with the first power transmitting device, the communication unit being configured to switch a spatially communicable communication range between a first range and a second range narrower than the first range; and
a control unit configured to, at the time of identifying the first power transmitting device from which electric power should be received, control the communication unit such that the communication unit communicates with the first power transmitting device using the second range, wherein
the control unit is configured to, when a second power transmitting device is recognized while communication is being carried out with the first power transmitting device using the second range, stop transmission of electric power from the first power transmitting device and from the second power transmitting device.

22. A power receiving device that contactlessly receives electric power from a first power transmitting device, comprising:
a power receiving unit configured to contactlessly receive electric power from the first power transmitting device;
a communication unit configured to carry out wireless communication with the first power transmitting device, the communication unit being configured to switch a spatially communicable communication range between a first range and a second range narrower than the first range; and
a control unit configured to, at the time of identifying the first power transmitting device from which electric power should be received, control the communication unit such that the communication unit communicates with the first power transmitting device using the second range, wherein
the control unit is configured to, when a second power transmitting device is recognized while communication is being carried out with the first power transmitting device using the second range, stop transmission of electric power from the first power transmitting device and from the second power transmitting device.

23. A first power transmitting device that contactlessly supplies electric power to a power receiving device, comprising:
a power transmitting unit configured to contactlessly transmit electric power to the power receiving device;
a communication unit configured to carry out wireless communication with the power receiving device, the communication unit being configured to switch a spatially communicable communication range between a first range and a second range narrower than the first range; and
a control unit configured to, at the time of identifying the power receiving device to which electric power should be transmitted, control the communication unit such that the communication unit communicates with the first power receiving device using the second range, wherein
the control unit is configured to, when a second power receiving device is recognized while communication is being carried out with the first power transmitting device using the second range, stop transmission of electric power to the first power receiving device and to the second power receiving device.

24. A contactless power supply system, comprising:
a first power transmitting device including a power transmitting unit;
a vehicle including a power receiving unit;
a communication unit configured to carry out wireless communication between the first power transmitting device and the vehicle, the communication unit switching a spatially communicable communication range between a first range and a second range narrower than the first range; and
a control unit configured to, at the time of identifying a combination of the first power transmitting device and the vehicle, control the communication unit such that the communication unit carries out communication using the second range, wherein electric power is contactlessly transferred from the first power transmitting device to the vehicle, wherein
the control unit is configured to, when a second power transmitting device is recognized while communication is being carried out with the first power transmitting device using the second range, stop transmission of electric power from the first power transmitting device and from the second power transmitting device.

25. The vehicle according to claim 1, wherein
the electric load includes an electrical storage device configured to store electric power received by the power receiving unit using the second range, and the control unit is configured to, after charging of the electrical storage device has been completed, switch the communication range from the second range to the first range for non-charging communication.

* * * * *